US005851050A

United States Patent [19]

Squire et al.

[11] Patent Number: 5,851,050

[45] Date of Patent: Dec. 22, 1998

[54] HYDRAULIC CLOSURE SYSTEM FOR A MOTOR VEHICLE

[75] Inventors: Eric D. Squire, Belleville; Maciej Bigoszewski, Royal Oak; Gareth J. Selfe, Farmington Hills, all of Mich.

[73] Assignee: Atoma International Inc., Ontario, Canada

[21] Appl. No.: 726,354

[22] Filed: Oct. 4, 1996

Related U.S. Application Data

[60] Provisional application No. 60/004,939 Oct. 6, 1995.

[51] Int. Cl.[6] .......... B60J 5/10

[52] U.S. Cl. .......... 296/146.4; 296/146.8; 49/28; 49/140; 49/324; 60/417

[58] Field of Search .......... 296/146.4, 76, 296/146.8, 106, 56; 49/324, 26, 28, 139, 140, 279, 280, 282, 298, 339, 340; 60/417, 418

[56] References Cited

U.S. PATENT DOCUMENTS

| | | | |
|---|---|---|---|
| 2,535,600 | 12/1950 | Rappl . | |
| 2,566,381 | 9/1951 | Svenson | 60/417 |
| 2,726,893 | 12/1955 | Zucker . | |
| 2,737,254 | 3/1956 | Bayley | 296/76 X |
| 4,595,182 | 6/1986 | Freitag et al. . | |
| 4,858,981 | 8/1989 | Post . | |
| 4,916,861 | 4/1990 | Schap . | |
| 4,995,194 | 2/1991 | Schultze et al. . | |
| 5,147,106 | 9/1992 | Bartelt et al. . | |
| 5,417,011 | 5/1995 | Keszthelyl . | |
| 5,434,487 | 7/1995 | Long et al. | 49/139 X |
| 5,477,677 | 12/1995 | Krnavek | 60/417 X |
| 5,531,498 | 7/1996 | Kowall | 296/146.4 |
| 5,563,483 | 10/1996 | Kowall et al. | 49/280 X |

FOREIGN PATENT DOCUMENTS

| | | | |
|---|---|---|---|
| 0580147 A1 | 7/1993 | European Pat. Off. . | |
| 0625625 A1 | 4/1994 | European Pat. Off. . | |
| 3636789 A1 | 10/1986 | Germany . | |
| 4007162 A1 | 3/1990 | Germany . | |
| 357126717 | 8/1982 | Japan | 296/146.4 |
| 404182590 | 6/1992 | Japan | 49/282 |
| 406099738 | 4/1994 | Japan | 296/146.8 |
| 40614400 | 5/1994 | Japan | 296/146.4 |

*Primary Examiner*—Joseph D. Pape
*Assistant Examiner*—Jason Morrow
*Attorney, Agent, or Firm*—Cushman Darby & Cushman; IP Group of Pillsbury; Madison & Sutro LLP

[57] ABSTRACT

A hydraulic closure system is disclosed for use in a motor vehicle that enables automatic opening and closing, as well as manual closing, of a closure pivotably mounted to an opening frame defining a closure opening in the motor vehicle. The system includes at least one hydraulic actuator assembly attached at opposite ends thereof to the closure and the opening frame, respectively. A motorized hydraulic pump inputs energy to the actuator to move the closure from the opened position to the closed position, and a biased energy storage system inputs energy to the actuator to move the closure from the closed position to the opened position. In a preferred embodiment, the pump is activated by manually generated movement of the closure from the opened position toward the closed position for a prescribed distance in more than a prescribed time. An obstacle detection mechanism detects obstacles interfering with closing of the closure based on monitored pressure in the system. A level detection and compensation feature adjusts the amount of energy stored in the biased energy storage system for opening the closure based on the detected inclination or declination of the vehicle so that the amount of energy stored is commensurate with the amount required to open the closure. An energy monitoring and control system maintains the amount of energy stored in the biased energy storage system for opening the closure within a predetermined range.

68 Claims, 3 Drawing Sheets

HYDRAULIC CLOSURE SYSTEM FOR A MOTOR VEHICLE

This application claims the benefit of U.S. Provisional application Ser. No. 60/004,939, filed Oct. 6, 1995.

BACKGROUND OF THE INVENTION

The present invention relates to a hydraulic closure system for a motor vehicle.

Sport utility vehicles and minivans have become very popular with automobile consumers and their popularity continues to grow. Such vehicles, because of their size, afford passenger and cargo space, as well as ease of ingress and egress, not afforded by cars.

Minivans and sport utility vehicles are typically equipped with a liftgate, also referred to as a cargo door or closure, usually located at the back of the vehicle. Typically, a liftgate is pivotally attached by hinges to the top of a cargo opening defined by an opening frame. The liftgate is opened by pivoting it upwardly and outwardly from the cargo opening.

In conventional liftgates, pneumatic "actuators" or "cylinders" containing compressed gas are provided on each side of the liftgate, one end of each being attached to the liftgate, the other end of each being attached at opposite sides of the opening frame. When the liftgate is closed and latched, the actuators are contracted and the gas within the actuators is compressed. When the liftgate is unlatched, the stored energy provided by the compressed air in the pneumatic actuators forces the liftgate to open partially, thus "popping" the gate. The liftgate must then be manually lifted while the actuators continue to exert an outward force on the liftgate that assists the manual opening of the liftgate. Eventually, the liftgate is manually lifted to a position at which the geometric relation of the actuators with respect to the center of gravity of the liftgate is such that moment arm associated with the lifting action becomes sufficiently large that the remaining energy in the actuators can take over the lifting movement of the liftgate and bring the liftgate and retain the liftgate in the fully opened position. More particularly, the pivoting dynamics of a liftgate are a function of the force exerted by the pneumatic actuators, the distance between the line of action of the actuators and the liftgate pivot axis, the weight of the liftgate, and the distance between the liftgate center of gravity and the liftgate pivot axis. The first two factors affect the upward moment acting on the liftgate due to the force of the actuators and last two factors affect the downward moment acting on the liftgate due to its own weight. The lengths of the actuator and the force of the gravity moment arms vary through the arcing movement of the liftgate. Therefore, the upward and downward acting moments also vary with position of the liftgate.

From the above it can be appreciated that conventional liftgates are designed with what is known in the art as an "overcenter condition." With this condition, the "center position" of movement is a position in the path of the liftgate in which the downward acting movement is equal to the upward acting moment. When the liftgate is moved below this position, the downward acting moment becomes greater than the upward acting moment and the liftgate will travel the remainder of the downward path under the force of its own weight. Alternatively, when the liftgate is moved above this position, the upward acting moment becomes greater than the downward acting moment and the liftgate will travel the remainder of the upward path under the force of the actuators.

Because of the size and weight of conventional liftgates is substantial, manual opening and closing can be awkward and cumbersome, especially if one's hands are full, for example, with groceries and/or small children.

To overcome the aforementioned difficulties encountered with vehicle liftgates, it has been proposed in U.S. Pat. No. 5,147,106 to Bartelt et al. to provide a rear vehicle gate with hydraulically powered automatic opening and closing capabilities. A hydraulic pump is connected to hydraulic actuators which are attached to the rear gate and to the rear gate opening. The actuators are extended to open the gate and contracted to close the gate by fluid flow from the pump. A problem associated with a hydraulic liftgate system such as that in Bartelt, however, relates to what is known as "hydraulic lock." That is, when the pump is off or malfunctioning, the rear gate cannot be closed manually, since hydraulic fluid is not permitted to flow through the system in desired fashion. In addition, manual closing of the liftgate cannot override the power closure during automated power opening and/or closing during operation of the hydraulic pump. Another disadvantage present in a system such as that disclosed in Bartelt is that both automatic opening and closing require operation and wear of the pump.

Another system proposed in U.S. Pat. No. 4,858,981 to Post provides a rear vehicle gate that is opened by hydraulic power. The gate is lifted by the hydraulic actuators under pressure from a hydraulic pump. However, automated closure is not provided.

For maximum convenience and efficiency, there is a need for a hydraulic liftgate system that provides both automatic opening and closing of the liftgate, while providing flexibility by permitting manual override of the automated system to permit manually generated closing of the liftgate, and while also conserving pump wear and tear by storing energy input to the system during closure of the liftgate, which energy can be subsequently used to open the liftgate.

An object of the present invention is to fulfill the needs expressed above. In accomplishing this object, a hydraulic closure system is provided for use in a motor vehicle and is constructed and arranged to cooperate with a closure opening defined by an opening frame of the motor vehicle body. The system comprising a closure constructed and arranged to be pivotally mounted on the opening frame for movement between a closed position in which the closure closes the closure opening and an opened position in which the closure is oriented to permit access through the closure opening. A latching structure is constructed and arranged to latch the closure in the closed position and to unlatch the closure to permit the closure to move from the closed position to the opened position. And a manually overridable power control system, including at least one hydraulic actuator assembly, a motorized hydraulic pump, and a biased energy storage system, is constructed and arranged to enable automatic opening and closing of the closure and to permit manual closing of the closure. The at least one hydraulic actuator assembly is coupled at one end thereof to the closure and is coupled at an opposite end thereof to the opening frame. The at least one hydraulic actuator assembly includes a cylinder and a piston rod assembly, and the piston rod assembly includes a piston and a rod member connected to the piston. The piston is moveable within the cylinder in slidably sealed relation with inner walls of the cylinder, and the rod member extends outwardly from a rod extension end of the cylinder. The piston rod assembly is moveable between an extended condition in which the rod member has a relatively large extent thereof extending outwardly from the rod extension end of the cylinder so as to create a distance between the opposite ends of the at least one hydraulic actuator assembly sufficient to maintain the closure in the opened position and a contracted condition in which the rod member has a relatively smaller extent thereof extending outwardly from the rod extension end of the cylinder in comparison with the extended condition to create a distance between the opposite ends of the at least one hydraulic actuator assembly that enables the closure to be disposed in the closed position. The biased energy storage system is constructed and arranged to store energy therein, and applies a biasing force to the at least one hydraulic actuator assembly sufficient to move the closure from the closed position to the opened position and maintain the closure in the opened position when the energy stored therein is expended. The motorized hydraulic pump is operable to input energy to the at least one hydraulic actuator assembly to effect the closing of the closure by creating hydraulic fluid flow in one direction with respect to the cylinder on a first side of the piston to force the piston away from the rod extension end of the cylinder and move the at least one hydraulic actuator assembly against the biasing force from the extended condition to the contracted condition and the closure from the opened position to the closed position. The biased energy storage system is constructed and arranged to store a portion of the energy input to the at least one hydraulic actuator assembly by the motorized hydraulic pump when the closure is moved by operation of the pump from the opened position to the closed position. The biased energy storage system is constructed and arranged to expend energy stored therein on a second side of the piston when the closure is unlatched and thus apply said biasing force to move the piston toward the rod extension end of the cylinder and hence create hydraulic fluid flow in an opposite direction with respect to the cylinder on the first side of the piston and thereby move the at least one hydraulic actuator assembly from the contracted condition to the extended condition and move the closure from the closed position to the opened position and maintain the closure in the opened position. The manually overridable control system constructed and arranged to permit manually generated movement of the closure from the opened position to the closed position to force the piston away from the rod extension end of the cylinder and move the at least one hydraulic actuator assembly against the biasing force from the extended condition to the contracted condition to create hydraulic fluid flow in the one direction with respect to the cylinder on the first side of the piston when the pump is in an inoperative state. The biased energy storage system is further constructed and arranged to store a portion of energy input to the at least one hydraulic actuator assembly by the manually generated movement of the closure from the opened position to the closed position to enable the energy storage system to subsequently move the closure from the closed position to the opened position when the stored energy is expended.

It is desirable to provide a liftgate having powered closing capability with an obstacle detection device that detects an obstacle interfering with proper closure of the liftgate and terminates the powered closing when the obstacle is detected A proposal described in Bartelt '106 includes a tape switch mounted along the door frame which will shut off the hydraulic system if an obstacle comes into contact with the tape. A disadvantage associated with this proposal is that the system will only be shut down when and if the obstacle contacts the tape, which is mounted on the door frame.

There is a need for an obstacle detection mechanism for a hydraulic liftgate system that promptly detects an obstacle interfering with closure of the liftgate regardless of the location at which the obstacle contacts the liftgate. It is another object of the present invention to fulfill this need. In accordance with this object, the present invention provides a hydraulic closure system for use in a motor vehicle and constructed and arranged to cooperate with a closure opening defined by an opening frame of the motor vehicle body. The hydraulic closure system comprises a closure constructed and arranged to be pivotally mounted on the opening frame for movement between a closed position in which the closure closes the closure opening and an opened position in which the closure is oriented to permit access through the closure opening. A latching structure is constructed and arranged to latch the closure in the closed position and to unlatch the closure to permit the closure to move from the closed position to the opened position. At least one hydraulic actuator assembly is coupled at one end thereof to the closure and coupled at an opposite end thereof to the opening frame and includes a cylinder and a piston rod assembly. The piston rod assembly includes a piston and a rod member connected to the piston, the piston being moveable within the cylinder in slidably sealed relation with inner walls of the cylinder. The rod member extends outwardly from a rod extension end of the cylinder. The piston rod assembly is moveable between an extended condition in which the rod member has a relatively large extent thereof extending outwardly from the rod extension end of the cylinder so as to create a distance between the opposite ends of the at least one hydraulic actuator assembly sufficient to maintain the closure in the opened position and a contracted condition in which the rod member has a relatively smaller extent thereof extending outwardly from the rod extension end of the cylinder in comparison with the extended condition to create a distance between the opposite ends of the at least one hydraulic actuator assembly that enables the closure to be disposed in the closed position. An automated closure opening system is constructed and arranged to effect automatic movement of the closure from the closed position to the opened position when the latching structure in unlatched. A motorized hydraulic pump is constructed and arranged to input energy to the at least one hydraulic actuator assembly to effect automatic movement of the closure from the opened position to the closed position by creating hydraulic fluid flow with respect to the cylinder on a first side of the piston to force the piston away from the rod extension end of the cylinder and move the at least one hydraulic actuator assembly from the extended condition to the contracted condition and the closure from the opened position to the closed position. An obstacle detection mechanism comprises a pressure transducer constructed and arranged to monitor hydraulic pressure resulting from the hydraulic fluid flow created on the first side of the piston by operation of the motorized hydraulic pump. The obstacle detection mechanism is constructed and arranged to detect an obstacle interfering with the automatic movement of the closure from the opened position to the closed position by operation of the motorized hydraulic pump based upon the hydraulic pressure monitored by the pressure transducer and to terminate operation of the motorized hydraulic pump when the interfering obstacle is detected.

The amount of force needed to open a liftgate against the force of gravity depends on the inclination or the declination of the vehicle, as the geometric orientation of the liftgate will affect the line of action of the gravitational force and gravitational moment arm relative to the geometry of the liftgate and actuators. Conventional liftgates having pneumatic actuators for assisting in opening the liftgate and prior proposals for hydraulically powered rear gates include no compensation for vehicle inclination or declination. While the system could be designed with a high pressure level so as to be able to open the liftgate under any inclination or declination, this will lead to unnecessary stress in components under pressure in circumstances when such high pressures are not required, and may cause opening of the liftgate at a rate that is faster than desired when the particular inclination or declination is favorable for opening.

It is an object of the present invention to overcome the deficiencies in the prior art noted above. In accordance with this object, the present invention provides a hydraulic closure system for use in a motor vehicle and constructed and arranged to cooperate with a closure opening defined by an opening frame of the motor vehicle body, the hydraulic closure system comprises a closure constructed and arranged to be pivotally mounted on the opening frame for movement between a closed position in which the closure closes the closure opening and an opened position in which the closure is oriented to permit access through the closure opening. A latching structure is constructed and arranged to latch the closure in the closed position and to unlatch the closure to permit the closure to move from the closed position to the opened position. At least one hydraulic actuator assembly is coupled at one end thereof to the closure and coupled at an opposite end thereof to the opening frame and includes a cylinder and a piston rod assembly. The piston rod assembly includes a piston and a rod member connected to the piston, the piston being moveable within the cylinder in slidably sealed relation with inner walls of the cylinder. The rod member extends outwardly from a rod extension end of the cylinder. The piston rod assembly is moveable between an extended condition in which the rod member has a relatively large extent thereof extending outwardly from the rod extension end of the cylinder so as to create a distance between the opposite ends of the at least one hydraulic actuator assembly sufficient to maintain the closure in the opened position and a contracted condition in which the rod member has a relatively smaller extent thereof extending outwardly from the rod extension end of the cylinder in comparison with the extended condition to create a distance between the opposite ends of the at least one hydraulic actuator assembly that enables the closure to be disposed in the closed position. A biased energy storage system is constructed and arranged to expend energy stored therein on a first side of the piston when the closure is unlatched to move the piston toward the rod extension end of the cylinder and thereby move the at least one hydraulic actuator assembly from the contracted condition to the extended condition and move the closure from the closed position to the opened position and maintain the closure in the opened position. A vehicle level detection and compensation system includes vehicle level detector constructed and arranged to detect inclination or declination of the motor vehicle. The vehicle level detection and compensation system is constructed and arranged to control the amount of energy stored in the biased energy storage system based upon a detected inclination or declination of the vehicle as detected by the vehicle level detector so that the energy stored in the biased energy storage system is commensurate with an amount of energy required to move the closure from the closed position to the opened position for the detected inclination or declination.

The effectiveness of an automated closure system which utilizes stored energy to open the closure may be adversely effected by the inability to maintain proper fluid pressure (either liquid or hydraulic fluid pressure) in the system. For example, in a closure which incorporates a charge of compressed gas, the pressure within the system may fluctuate due to fluctuations in temperature. Particularly, temperature increases will increase the pressure of the compressed gas, while temperature decreases will decrease the pressure of the compressed gas. Also hydraulic systems may be subject to pressure fluctuations due to other causes, such as system leaks.

There is a need to provide a hydraulic liftgate or closure system that employs stored energy for opening the closure, and that monitors and maintains a sufficient amount of stored energy to open the closure. It is an object of the present invention to fulfill this need.

In accordance with this object, the present invention provides a hydraulic closure system for use in a motor vehicle and constructed and arranged to cooperate with a closure opening defined by an opening frame of the motor vehicle body. The system comprises a closure constructed and arranged to be pivotally mounted on the opening frame for movement between a closed position in which the closure closes the closure opening and an opened position in which the closure is oriented to permit access through the closure opening. A latching structure is constructed and arranged to latch the closure in the closed position and to unlatch the closure to permit the closure to move from the closed position to the opened position. At least one hydraulic actuator assembly includes a cylinder and a piston rod assembly, and the piston rod assembly includes a piston and a rod member connected to the piston, the piston being moveable within the cylinder in slidably sealed relation with inner walls of the cylinder. The rod member extends outwardly from a rod extension end of the cylinder. The piston rod assembly is moveable between an extended condition in which the rod member has a relatively large extent thereof extending outwardly from the rod extension end of the cylinder so as to create a distance between the opposite ends of the at least one hydraulic actuator assembly sufficient to maintain the closure in the opened position and a contracted condition in which the rod member has a relatively smaller extent thereof extending outwardly from the rod extension end of the cylinder in comparison with the extended condition to create a distance between the opposite ends of the at least one hydraulic actuator assembly that enables the closure to be disposed in the closed position. A biased energy storage system is constructed and arranged to expend energy stored therein on a first side of the piston when the closure is unlatched to move the piston toward the rod extension end of the cylinder and thereby move the at least one hydraulic actuator assembly from the contracted condition to the extended condition and move the closure from the closed position to the opened position and maintain the closure in the opened position. An energy monitoring device is constructed and arranged to monitor the amount of energy stored in the biased energy storage system. And an energy control system is in communication with the energy monitoring device and is constructed and arranged to control the amount energy stored in the biased energy storage system so that the amount of energy remains within a predetermined range so that the amount of energy remains commensurate with the energy required to move the closure from the closed position to the opened position.

It is a further object of the present invention to provide an automated hydraulic closure system in which automatic closure of the closure by operation of a motorized hydraulic pump can be commenced in response to manually generated movement of the closure from the opened position toward the closed position for a prescribed distance in more than a prescribed time.

It is another object of the invention to provide a system which contemplates any hydraulic system with manual override. In accordance with this object, the present system provides a hydraulic closure system for use in a motor vehicle and constructed and arranged to cooperate with a closure opening defined by an opening frame of the motor vehicle body. The system comprises a closure constructed and arranged to be mounted on an upper portion of the opening frame and pivoted for movement about a horizontal axis between a closed position in which the closure closes the closure opening and an opened position in which the closure is oriented to permit access through the closure opening. An electrically operated latching structure is constructed and arranged to latch the closure when the closure is moved to the closed position and to unlatch the closure in response to a first electrical signal to permit the closure to move from the closed position to the opened position. A manually overridable power control system includes at least one hydraulic actuator assembly which couples the closure with the closure opening and is capable of effecting movement of the closure between the opened and closed positions in response to hydraulic fluid flow generated by the manually overridable power control system. The manually overridable power control system is constructed and arranged to effect hydraulic fluid flow that causes the at least one hydraulic actuator assembly to move the closure from the closed position to the opened position when the latching structure is unlatched in response to the first electrical signal, and to effect hydraulic fluid flow that causes the at least one hydraulic actuator assembly to move the closure from the opened position to the closed position in response to a second electrical signal. A remote control device is provided. An electrical controller responsive to selective activation of the remote control device is provided to generate the first electrical signal to unlatch the latching structure and thereby permit the manually overridable power control system to effect hydraulic fluid flow that causes the at least one actuator to move the closure from the closed position to the opened position. The electrical controller is responsive to selective activation of the remote control device to generate the second electrical signal so that the manually overridable power control system effects hydraulic fluid flow that causes the at least one hydraulic actuator assembly to move the closure from the opened position to the closed position. The manually overridable power control system also permits manually generated movement of the closure from the opened position to the closed position.

A still further object of the invention is to provide methods for operating a hydraulic closure system for a motor vehicle, which methods accomplish each of the objects noted above.

In accordance with a first method of operating the hydraulic closure system for a motor vehicle, the method comprises opening the closure by activating a remote control device to unlatch the closure and to effect hydraulic fluid flow which causes the at least one hydraulic actuator assembly to move the closure from the closed position to the opened position. The method further comprises closing the closure by optionally (a) activating the remote control device to effect hydraulic fluid flow which causes the at least one hydraulic actuator assembly to move the closure from the opened position to the closed position, or (b) manually engaging the closure and providing manually generated movement of the closure to move the closure from the opened position to the closed position.

In accordance with a second method of operating the hydraulic closure system for a motor vehicle, the method comprises actuating a remote control device to effect flow of hydraulic fluid in communication with the at least one hydraulic fluid actuator assembly, moving the closure from the opened position toward the closed position in response to the flow of the hydraulic fluid in communication with the at least one hydraulic fluid actuator assembly, detecting a level of hydraulic fluid pressure of the hydraulic fluid in communication with the at least one hydraulic fluid actuator assembly, and terminating the flow of hydraulic fluid in response to a detected level of hydraulic fluid pressure outside of a prescribed range to terminate movement of the closure from the opened position toward the closed position.

In accordance with a third method of operating the hydraulic closure system for a motor vehicle, the method comprises utilizing energy stored in the hydraulic closure system to move the closure from the closed position to the opened position when the closure is unlatched, increasing the amount of energy stored in the hydraulic closure system if the amount of energy stored is less than a prescribed range of energy, thus maintaining the amount of energy stored in the hydraulic closure system within the prescribed range of energy, and decreasing the amount of energy stored in the hydraulic closure system if the amount of energy stored is more than the prescribed range of energy, thus maintaining the amount of energy within the prescribed range of energy.

These and other objects of the present invention will become more apparent during the course of the following detailed description and appended claims. The invention may best be understood with reference to the accompanying drawings wherein an illustrative embodiment is shown.

DETAILED DESCRIPTION OF THE INVENTION

Figure 1:
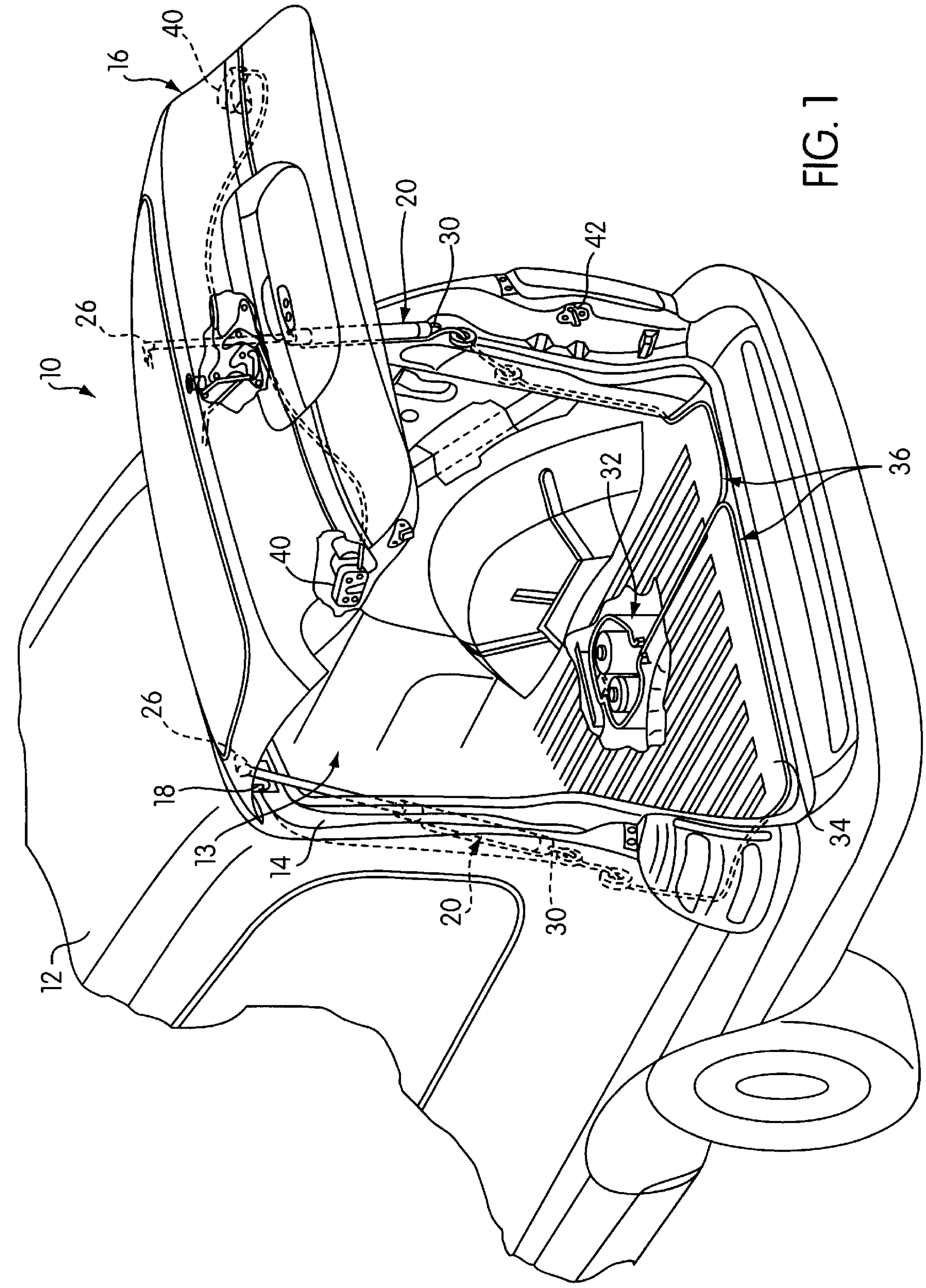
FIG. 1 is a perspective view of a motor vehicle employing a hydraulic power liftgate in accordance with the principles of the present invention.

FIG. 1 is a perspective view of the rear portion of a minivan, generally indicated at 10, which employs a hydraulic power liftgate, or closure, in accordance with the principles of the present invention. The minivan 10 comprises a main body 12, which has a rearward liftgate opening or door aperture 13 defined by a rearward opening frame 14. A liftgate, generally indicated at 16, is pivotally mounted on an upper horizontal portion of opening frame 14 by a pair of laterally spaced hinges 18 (only one being shown in FIG. 1).

Figure 2:
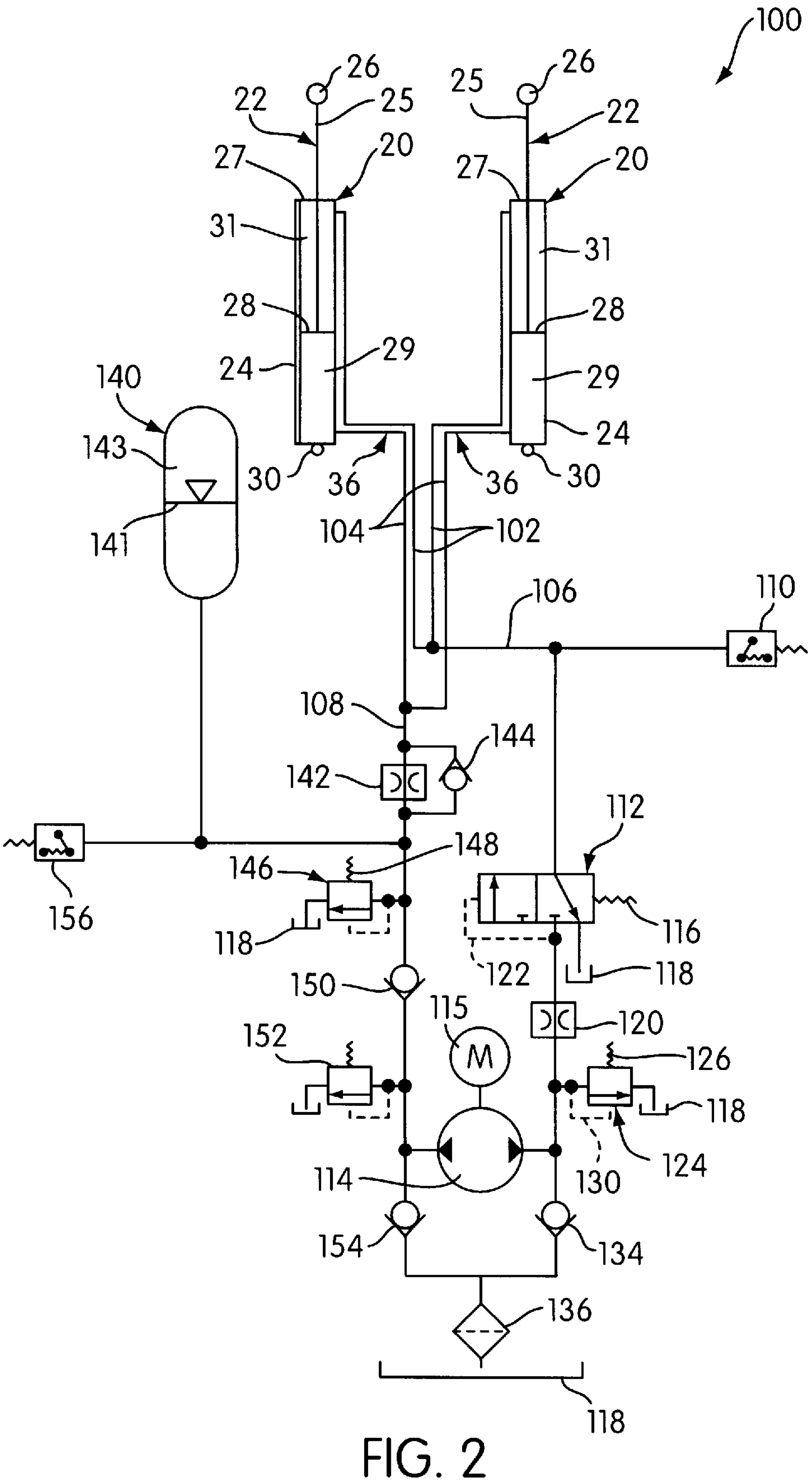
FIG. 2 is a hydraulic system schematic of the hydraulic power liftgate in accordance with the principles of the present invention.

A hydraulic actuator assembly, preferably in the form of a pair of hydraulic actuators 20, is interconnected between the liftgate 16 and the opening frame 14, with the lower end of each being pivotally connected at respective opposite vertical portions of opening frame 14, and with the upper end of each being pivotally connected at respective adjacent opposite upper interior portions of the liftgate 16. More specifically, as shown in FIG. 2, each hydraulic actuator 20 comprises a piston rod assembly 22 and cylinder member 24. Each piston rod assembly 22 includes a rod member 25 having a distal portion thereof extending outwardly from a rod extension end 27 of the cylinder member 24, and hydraulic fluid sealing member or piston 28 disposed in slidably sealed relation with the inner walls of the cylinder 24. The distal end 26 of each rod member 25 is pivotally connected with an upper interior portion of the liftgate 16, and the opposite end of the rod member 25 is connected with the hydraulic fluid sealing member or piston 28 within the cylinder member 24(see FIG. 2). Each cylinder member 24 has its lower end 30 pivotally connected on respective opposite vertical portions of the door opening frame 14.

It will be appreciated by those skilled in the art that the orientation of the actuators 20 disclosed above is merely illustrative, and that any particular configuration of the hydraulic actuators that would accomplish the opening and closing function is possible. For example, it is possible to provide only a single actuator 20. The present invention further contemplates that the actuators may be inverted so that the distal end 26 of rod members 25 are connected with the door opening frame 14 and the ends 30 of the cylinder members 24 are connected with the liftgate 16.

A hydraulic pump assembly 32 is mounted beneath the vehicle floor 34 and provides hydraulic fluid through hydraulic lines, generally indicated at 36, to the hydraulic actuators 20. The hydraulic pump assembly 32 functions to provide hydraulic fluid to the hydraulic actuators 20 as needed to cause such cylinders to automatically close the liftgate 16.

A latching structure, preferably in the form of a pair of electrically operated latching mechanisms 40, is provided to latch and unlatch the liftgate to and from the closed position. The latching mechanisms 40 are provided at opposite lower interior portions of the liftgate 16 and are cooperable with associated striker members 42 (only one being shown in FIG. 1) mounted on the opposite vertical portions of the opening frame 14. When the liftgate 16 is closed, each power latching mechanism 40 latches with the associated striker member 42 to secure the liftgate 16 in its closed position.

Shown in FIG. 2 is a hydraulic system, generally indicated at 100, in accordance with the principles of the present invention. From FIG. 2 it can be appreciated that the hydraulic lines 36 include a hydraulic liftgate pull-down line 106 and a hydraulic liftgate lift line 108. As shown, the pull-down line 106 is divided into two hydraulic line segments 102 proximate the hydraulic actuators 20. Each of the segments 102 are connected in fluid communication with a respective upper chamber 31 of the cylinder member 24 of one of the associated actuators 20. Similarly, the lift line 108 is divided into two hydraulic line segments 104 proximate the actuators 20. The segments 104 are each connected in fluid communication with a respective lower chamber 29 of the cylinder member 24 of one of the associated actuators 20. The segments 102 of line 106 are in fluid communication with the chambers 31 at positions above that which can be attained by sealing members 28, while segments 104 of lift line 108 are in fluid communication with the associated chambers 29 at positions below that which can be attained by sealing members 28.

The hydraulic pump assembly 32 preferably includes a bi-directional hydraulic pump 114 and a D.C. electric motor 115 for actuating the pump 114. The pump 114 preferably is connected between the pull-down line 106 and lift line 108, and is capable of individually pressurizing each of said lines with hydraulic fluid withdrawn from the fluid reservoir 118. More specifically, in a preferred embodiment of the present invention as schematically represented in FIG. 2, the right side of the hydraulic pump 114 is connected with pull-down line 106, while the left side of the pump 114 is connected with lift line 108.

Preferably disposed within the pull-down line 106 is a pull-down pressure transducer 110, which measures hydraulic pressure in the pull-down line 106.

The pull-down line 106 further includes a pull-down valve 112, which preferably comprises a two position three-way valve, disposed between the bi-directional hydraulic pump 114 and the upper chambers 31 of hydraulic actuators 20 for controlling the flow of hydraulic fluid therebetween. The pull-down valve 112 is shown as being biased by a conventional valve spring, symbolically indicated at 116, into its normal (rest) position. In this position, the pull-down valve 112 permits fluid communication between the upper cylinder chambers 31 and a hydraulic fluid reservoir 118. When the pull-down line 106 is pressurized by the right side of hydraulic pump 114, pressurization in the dashed hydraulic valve pilot line 122 of pull-down valve 112 shifts the pull-down valve 112 to the right, against the force of valve spring 116, so as to permit hydraulic fluid to flow from the hydraulic pump 114 to the upper cylinder chambers 31, while cutting off communication between the upper chambers 31 and the hydraulic fluid reservoir 118.

It should be appreciated that, although there are several schematic representations of the hydraulic fluid reservoir 118 in FIG. 2, this is done solely for the convenience of illustration, as the hydraulic system 100 in actuality comprises only a single common hydraulic fluid reservoir 118.

Disposed in the pull-down line 106 between the right side of hydraulic pump 114 and the pull-down valve 112 is a pull-down pressure relief valve 124. Preferably, a flow restrictor 120 is disposed between the pull-down pressure relief valve 124 and the pull down valve 112. The pressure relief valve 124 is spring biased, by a valve spring, schematically indicated at 126, into a normally closed position. Pressure relief valve 124 will shift against the bias of valve spring 126 when the dashed hydraulic valve pilot line 130, which is subject to the pressure in pull-down line 106, is pressurized to unacceptably high levels opening of valve 124 will enable the hydraulic fluid in the pull-down line 106 between pull-down valve 112 and pump 114 to drain into hydraulic fluid reservoir 118 thus relieving any excess fluid pressure. The pressure relief valve 124 is not intended to be opened during the normal course of operation of the hydraulic system 100, but is intended to function as a safety valve that opens only in the event of overpressurization of the pull-down line 106 by pump 114. Thus, pressure relief valve 124 is set to open at a greater pressure than the pressure required to move pull-down valve 112 to the right against the force of spring 116.

The pull-down line 106 also includes a pull-down suction line check valve 134 disposed in a direct line between the right side of hydraulic pump 114 and the hydraulic fluid reservoir 118. The check valve 134 functions as a one-way valve that permits the right side of hydraulic pump 114 to withdraw hydraulic fluid from the reservoir 118 to be discharged from the left side of pump 114 but prevents hydraulic fluid from being discharged from the right side of hydraulic pump 114 directly into the hydraulic fluid reservoir therethrough. Preferably, a filter 136 is provided between the check valve 134 and the hydraulic fluid reservoir 118 to prevent contamination of the hydraulic lines and or pump.

The lift line 108 incorporates a biased energy storage system, preferably in the form of a gas-charged hydraulic fluid accumulator assembly 140, and preferably the type of accumulator having a diaphragm 141 separating a charge of compressed gas 143 from the hydraulic fluid in the hydraulic system 100. The compressed gas 143 applied a biasing force that pressurizes the hydraulic fluid in the lift line 108. Although a gas-charged accumulator is preferred a spring-loaded accumulator or energy storage system may also be used. In a spring-loaded system, a spring applies a biasing force on a diaphragm or piston to exert pressure on the hydraulic fluid in the lift line 108. The biased energy storage system is used to store and release energy and is preferably capable of providing a relatively constant pressure (approximately ±5%) which is exerted on the volume of hydraulic fluid that is in the hydraulic lift line circuit. The accumulator assembly 140 is maintained in fluid communication with the lower chambers 29 of the cylinder members 24 through lift line 108. Accordingly, the accumulator assembly provides a biasing force tending to urge extension of the hydraulic actuators 20 and thus to urge the closure or liftgate toward the opened position. Disposed between the accumulator assembly 140 and the lower chambers 29 is a flow restrictor 142, which limits the speed at which hydraulic fluid can travel to the lower cylinder chambers 29 from the accumulator assembly 140. A bypass check valve 144 functions as a one-way valve that bypasses the flow restrictor 142 so that the travel of hydraulic fluid to the accumulator assembly 140 from the lower chambers 29 is not limited by the flow restrictor 142. A lift line pressure relief valve 146 is biased by a valve spring, schematically illustrated at 148, into a normally closed position. The pressure relief valve 146 functions to drain hydraulic fluid into the hydraulic fluid reservoir 118 in the event of overpressurization of the accumulator assembly and/or lower cylinder chambers 29 in a manner to be described later.

A lift line check valve 150 is a one-way valve disposed in the lift line 108 that prevents flow of hydraulic fluid from the accumulator assembly 140 and the lower cylinder chambers 29 towards the pump 114 or fluid reservoir 118, but permits flow in the opposite direction.

Another lift-line pressure relief valve 152 is preferably provided between the hydraulic pump 114 and the check valve 150, and functions as a safety valve to relieve overpressurization in this portion of lift line 108. Pressure relief valve 152 is set to open at a higher pressure than pressure relief valve 146 and will be opened only in the event that the pump exceeds the maximum allowable operating pressure. This safety pressure relief valve 152 can optionally be omitted (upon integration of relief valve 146 and check valve 150 into the pump body).

A lift line check valve 154 is preferably provided between the left side of the hydraulic pump 114 and the hydraulic fluid reservoir 118 and functions as a one-way valve to prevent flow of hydraulic fluid discharged from the left side of hydraulic pump 114 directly into the reservoir 118, while permitting fluid to be withdrawn from the hydraulic fluid reservoir 118 by the left side of pump 114 to be discharged from the right side of pump 114. Filter 136 prevents cross contamination between the hydraulic fluid reservoir 118 and the remainder of the hydraulic circuit, especially the hydraulic pump 114.

Figure 3:
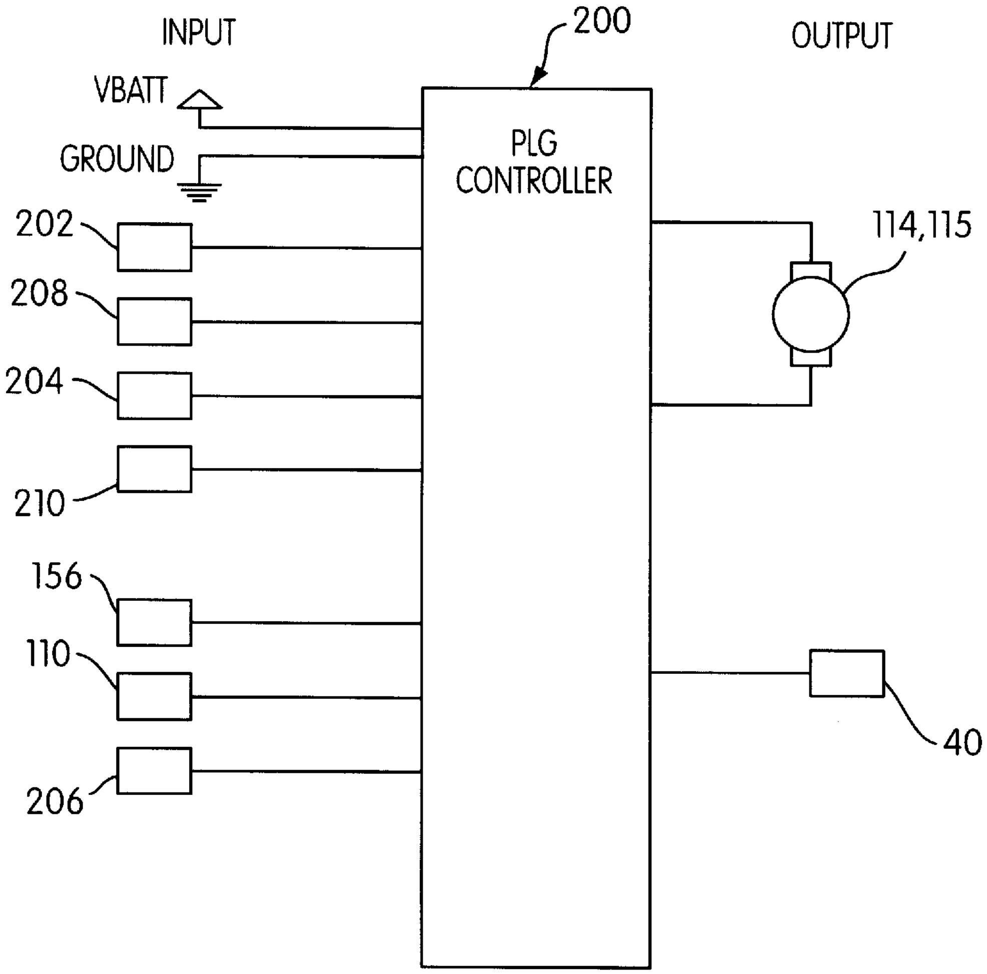
FIG. 3 is an electrical schematic of the electrical control system of the hydraulic power liftgate in accordance with the principles of the present invention.

Preferably, a lift line pressure transducer 156 communicates with the lift line 108 and constantly measures the common pressure in the accumulator assembly 140 and the lower cylinder chambers 29. When the transducer 156 detects that the measured pressure is less than a predetermined level, the transducer 156 will send a signal to the system electronic control module 200 (See FIG. 3), which in turn sends a signal to pump motor 115 to cause the pump 114 to pressurize the lift line 108, accumulator assembly 140, and lower chambers 29. As will be appreciated from FIG. 2, controller 200 performs all system logic operations.

The operation of the present invention will now be described generally.

When the liftgate 16 is in its closed position, the energy stored in the accumulator assembly 140 in the form of compressed gas is sufficient to move the liftgate from the closed position to the opened position. To open the liftgate, the latching mechanisms 40 must first be unlatched. The latching mechanisms 40 may be unlatched either by manual movement of an outside release handle on the liftgate, or automatically upon receiving a signal from the controller 200. The controller 200 will generate the appropriate signal to open the latching mechanisms 40 when the controller receives an input signal which is generated upon manual actuation of a remote control device, such as electrical switch 202 (See FIG. 3) hardwired within the vehicle or a wireless remote (such as a conventional infrared device). Upon release of the electrically powered latching mechanisms 40, the hydraulic fluid is permitted to flow from the accumulator assembly 140 and into the cylinder members 24. The hydraulic energy stored within the accumulator 140 will be expended by expansion of the gas 140 and movement of the diaphragm 141 against the hydraulic fluid in line 108 to cause fluid flow within chambers 29. As a result, it can be appreciated that the stored energy of the compressed gas is utilized to exert a biasing force by fluid pressure upon one side of sealing members 28. Once the latching structure is unlatched, the biasing force causes the sealing members 28 to move upwardly within the cylinder members 24. Upward movement of sealing members 28 will cause the respective rod members 25 to extend outwardly relative to the cylinder members 24 and the lower chambers 29 to expand linearly. It can be thus appreciated that the pressure maintained in the accumulator assembly 140 and lower chambers 29 is sufficient to cause the piston rod assemblies 22 to be moved outwardly against the weight of the liftgate 16 to lift the liftgate 16 to its fully opened position and maintain the liftgate 16 in its fully opened position in a passive manner. Particularly, it can be appreciated that this lifting action is accomplished without resort to any pumping action of the hydraulic pump 114.

It should be appreciated that the liftgate according to the present invention does not have an "overcenter" condition as the biasing force applied by the accumulator 140, or other energy storage system, constantly urges the liftgate into an opened position from any position at which the liftgate is released.

As lower cylinder chambers 29 expand linearly, the fluid in the contracting upper cylinder chambers 31 is drained via pull-down line 106 through the normally positioned hydraulic pull-down valve 112, and into the hydraulic fluid reservoir 118. In a preferred embodiment, the lift line pressure transducer 156 performs continuous measurement of the pressure in the lift line 108 between the check valve 150 and the accumulator 140. If at any time during operation, or otherwise, the pressure in the accumulator assembly 140 and the lower chambers 29 are below a predetermined pressure that is set according to the pressure necessary for properly lifting the liftgate 16, the transducer 156 will send an electrical signal to the electronic control module 200, which in turn sends a signal to actuate the pump motor 115. As a result, the right side of pump 114 will withdraw hydraulic fluid from the reservoir 118 through the filter 136 and the check valve 134, and then discharge such hydraulic fluid from the left side thereof past the check valve 150 and into the accumulator assembly 140 and lower cylinder chambers 29. The pump 114 will continue to function in such fashion until the transducer 156 detects that the pressure within accumulator assembly 140 and lower cylinder chambers is equal to or greater than the predetermined pressure.

It is contemplated, however, according to the most basic principles of the present invention that lift line 108 may not be connected to pump 114. In this arrangement, the liftgate is opened solely by the energy stored in the accumulator assembly 140 and pump 114 may be a single direction pump connected to the pull-down line 106 only.

To close the liftgate by hydraulic power, the remote control device, such as hardwired motor vehicle electric switch 202 (SEE FIG. 3) or wireless remote, is actuated and sends a signal to the controller 200, which in turns sends a signal to pump motor 115 to actuate pump 114. The pump 114 inputs energy to the hydraulic actuators 20 when the left side of the hydraulic pump 114 withdraws hydraulic fluid from the hydraulic fluid reservoir 118 through the filter 136 and check valve 154, and the right side of the pump pressurizes the pull-down line 106. Hydraulic fluid pressure in valve activation pilot line 122 moves the pull-down valve 112 to the right in FIG. 2 against the force of valve spring 116. Hydraulic fluid is thus pumped through valve 112 and discharge into the upper cylinder chambers 31. Pressurization of chambers 31 forces sealing members 28 downwardly into the respective cylinder members 24 to withdraw the piston rod assemblies 22 into the respective cylinder members 24 and thereby pull liftgate 16 closed. As upper cylinder chambers 31 are expanded, the respective lower cylinder chambers 29 are compressed. The fluid expelled by the compression of the lower cylinder chambers 29 is forced back past check valve 144 into the accumulator assembly 140 at relatively constant pressure. It should be noted that under normal operating conditions, the fluid volume within the lower cylinder chambers 29 and the accumulator assembly are not disturbed by valves or the pump.

It can be appreciated that the relatively constant pressure in accumulator assembly 140 is at all times applied to cylinder chamber 29 side of sealing member 28. This results in the biasing force tending to urge the piston rod assemblies 22 to extend from their respective cylinder members 24 and thus tending to urge the liftgate into its open position. When the liftgate is closed, it is closed against this biasing force, and the movement of fluid into the accumulator as a result of the liftgate being closed restores potential energy to the accumulator assembly 140 by action of the diaphragm further compressing the charge of compressed gas 143.

After the liftgate 16 is latched closed at the end of travel, pump 114 is turned off, and the pull-down valve 112 returns to its normal position as shown in FIG. 2. Subsequently, hydraulic fluid pressure within the upper chambers 31 is permitted to drain through pull-down valve 112, and into reservoir 118. After such drainage, the hydraulic pressure in the accumulator 140 and lower chambers 29 will be sufficiently greater than the pressure in the upper chambers 31 to enable the cylinders 20 to automatically lift the liftgate 16 when subsequently unlatched.

It is contemplated that lift line 108 and pull down line 106 may be switched so that they connect to chambers 31 and 29, respectively, and pump 114 would be a vacuum pump and the biased energy storage system would store a energy in the form of a vacuum instead of a pressure. The liftgate 15 then closed by operation of the vacuum pump to create a vacuum in chamber 29 sufficient to contract the actuators and effect closing of the door. This vacuum energy is stored in the energy storage system in the form of a constant vacuum. When the door is unlatched and chamber 29 is opened to atmospheric pressure, the vacuum energy applied to chamber 31 is sufficient to effect extension of the actuators and thus opening of the liftgate.

Specific features of the invention will now be described.

Manual Override Feature

In the preferred embodiment of the present invention, the hydraulic system 100 provides a manually overridable power control system which includes at least one hydraulic actuator 20, the motorized hydraulic pump 32, and the biased energy storage system preferably in the form of the accumulator 140. The manually overridable power control system permits the liftgate 16 to be manually opened or closed at any time after the power latching mechanisms 40 have been unlatched from their respective striker members 42, without the possibility of hydraulic lock preventing such manually generated movement. For example, when the liftgate 16 is in the opened position, it is possible to close the liftgate manually rather than by using the pumping action of hydraulic pump 114. It is to be understood that the present invention contemplates that the liftgate can be moved manually by manual engagement of the liftgate for the entire distance from the opened position to the closed position, or alternatively manually engaged for a brief instance and then released after being moved with sufficient speed to cause the momentum of the liftgate to carry the liftgate to the closed position at which the liftgate is slammed shut. In both instances, the manual movement is manually generated. Thus, the term “manually generate” movement as used herein refers to both types of manual movement.

When the liftgate 16 is manually forced downwardly from its opened position, the rod assemblies 22 are forced into their respective cylinder members 24, and the fluid within the lower cylinder chambers 29 is forced through lift line 108, past the check valve 144 (bypassing flow restrictor 142), and into the accumulator assembly 140. The fluid expelled by the compression of the lower cylinder chambers 29 is forced back into the accumulator assembly at relatively constant pressure so the energy put into the hydraulic liftgate system while manually closing the liftgate is stored by the accumulator assembly 140. Any excess pressure that builds in the lower chambers 29 or accumulator assembly 140 will be drained via lift line pressure relief valve 146. As the upper cylinder chambers 31 are expanded during this manually forced movement of the rod assemblies 22, hydraulic fluid is withdrawn from the hydraulic fluid reservoir 118 through the pull-down valve 112 and replenished in the upper cylinder chambers 31.

During opening of the liftgate 16, manual assistance can also be performed. More specifically, while the hydraulic pressure accumulated within accumulator assembly 140 and the lower cylinder chambers 29 function to automatically open the liftgate 16 when it is unlatched, it is possible to expedite the opening of the liftgate by manually pulling it upwardly. During this movement, hydraulic fluid is drawn from the accumulator assembly 140 by the expanding lower cylinder chambers 29 while hydraulic fluid within the upper cylinder chambers 31 is expelled through the pull-down valve 112 and drained into the hydraulic fluid reservoir 118. Opening is expedited because fluid is both forced into lower chamber 29 by accumulator assembly 140 and drawn into lower chamber 29 by the expanding volume of chamber 29 due to the manually assisted upward movement of the liftgate. Fluid is drawn into lower chamber 29 and forced from upper chamber 31 at a rate determined by the additional manual force exerted.

During pump-activated closing of the liftgate 16, it is preferred that the closing operation can be expedited or assisted in similar fashion. In this instance, hydraulic fluid in the lower cylinder chambers 29 is forced into accumulator 140 at a rate determined, at least initially before the flow capacity of the fluid system is achieved, by the additional manual force exerted. Similarly fluid is drawn into upper cylinder chamber 31 at a rate more rapid than that provided by operation of the pump alone. The additional fluid is drawn from reservoir 118 through check valve 134.

A hydraulic control system according to the most basic principles of the present invention need not be provided with check valve 134. Without check valve 134, manually assisted closure during power operation of the pump is not achieved. Nevertheless, manual closure of the liftgate while the pump is in an inoperative state (i.e., either inactivated or malfunctioning) is still possible, as pull down valve 112 permits hydraulic flow. That is, when pump 114 is in an inoperative state, pull down valve 112, disposed in its normal position, will permit fluid from reservoir 118 into chambers 31 during manual closing.

In addition, at any time during the automated opening or closing of the liftgate, the liftgate can be manually stopped and forced into an opposite direction to its motion. Manual stoppage of the liftgate 16 when the liftgate is being hydraulically closed will cause the pump 114 to automatically turn off. This will be more fully appreciated by reference to the obstacle detection feature, described in the next section.

Another advantage of the manual override feature is that it permits the hydraulic system 100 to operate in a completely manual mode at any time by simply disabling the motor 115 to hydraulic pump 114, for example, by activating a switch 204 provided within the vehicle (See FIG. 3) or a wireless remote. In addition, this feature is also greatly advantageous in that it permits complete manual operation in the event of pump or battery failure.

Obstacle Detection Feature

During power closure of the liftgate 16, the hydraulic system 100 is preferably capable of detecting an obstruction, and, in response to such detection, the pump motor 115 is shut off to terminate the pumping operation of the hydraulic pump 114. More specifically, as pump 114 pressurizes the upper cylinder chambers 31, an obstacle detection mechanism, preferably in the form of the pull-down pressure transducer 110 continuously measures the pressure in pull-down line 106 between the pump 114 and upper chambers 31. The force exerted on the liftgate 16 by an obstacle can be derived from the pressure in the pull-down line 106. When the pull-down transducer 110 detects a pressure above a predetermined threshold level as determined by the electronic control module 200, thus indicating that an obstacle is preventing proper expansion of upper chambers 31 and liftgate closure, the electronic control module 200 will send a signal to pump motor 115 to terminate operation of the hydraulic pump 114. The system of this embodiment is also preferably provided with a biased energy storage system, such as accumulator assembly 140, so that at this point, the hydraulic system will function in the manual mode, and the pressure within the accumulator assembly 140 will be expended and the pressure within the lower cylinder chambers 29 will become greater than the pressure in upper chambers 31. As a result, the piston members 22 will be driven upwards and the liftgate 16 will automatically move passively, and with minimal force, into its opened position.

Preferably, the predetermined threshold pressure that controller 200 compares against the pressure in pull-down line 106 as measured by the pull-down pressure transducer 110 is made to be a function of the position of the liftgate 16. More specifically, as the position of the liftgate changes, so will the pressure within the pull-down line 106, and the controller 200 takes this into account when determining whether an obstacle exists. There are three major factors which contribute to the change in pressure in the pull-down line 106 with respect to the liftgate position.

First, it can be appreciated that, at varying positions of the liftgate, there will be varying gravitational moment acting on liftgate 16 that assist the pull-down operation. For example, due to the position of the center of gravity of the liftgate 16 relative to its hinged connection 18 to the vehicle body, there will be significantly greater gravitational moment assisting closure of the liftgate when it is in the fully opened position (horizontal) than when the liftgate is almost closed (vertical).

Second, when the liftgate is in its fully open position, the perpendicular distance from the line of action of each rod assembly 22 to the pivot axis of the liftgate 16 is approximately maximized. This forms a relatively large moment arm for movement of the liftgate. On the other hand, when the gate is nearing its closed position, the perpendicular distance from the line of action of each rod assembly 22 and the pivot axis of the liftgate 16 is substantially smaller, and the moment arm for movement of the liftgate is substantially reduced.

Third, when the liftgate is being closed, and the lower cylinder chambers are compressed, pressure builds within the accumulator assembly 140, which pressure opposes the hydraulic forces provided by the hydraulic pump 114 to effectuate closure. It is thus desirable to continuously adjust the obstacle detection threshold pressure values to effectuate sensitive and consistent obstacle detection actuation forces at the liftgate.

To account for the varying pressure in the pull-down line 106 with respect to the liftgate position, one of the cylinders 20 is equipped with linear potentiometer 206 (See FIG. 3) or a similar position feedback device on the liftgate that is calibrated to determine the relative position of the liftgate. The position feedback device 206 sends a signal to the main controller 200. By correlating the pressure measured by the pull-down pressure transducer 110 with the relative position of the liftgate 16 as measured by the position feedback device 206, the controller is capable of determining whether the pressure within the pull-down line is within a predetermined range for the relative position of the liftgate 16. If the controller determines that the pressure within the lift line 106 is greater than the predetermined range, thus indicating that an obstacle is in place, the controller will send a signal to the pump motor 115 to disable the pump, and the hydraulic system 100 will then assume the manual mode of operation.

In a preferred embodiment of the present invention, the obstacle detection feature is disabled during the liftgate's last few millimeters of downward travel so that the hydraulic system does not mistake the engagement of the liftgate with the opening frame as the detection of an obstacle. This ensures that that hydraulic fluid continues to be pumped into the actuators 20 at the very end of the closure cycle in order to accomplish final sealing and latching of the liftgate in the closed position.

The obstacle detection feature can, of course, be configured so that the predetermined threshold pressure is a constant value that corresponds to the highest pressure expected to be encountered in the pull-down line during closure.

As alternative arrangements, obstacle detection can be determined by changes in electrical current draw in the hydraulic pump motor 115, and the liftgate position can be derived from the volumetric flow of hydraulic fluid within the hydraulic system. In addition, because the speed of the liftgate opening and closing is relatively constant, the liftgate position can be approximated as a function of time.

As an additional obstacle detection feature, a pressure sensitive strip or tape switch 208 is employed along the periphery of the door opening frame 14 in accordance with U.S. patent application Ser. No. 08/500,364, filed Jul. 10, 1995, which is hereby incorporated by reference. When an obstacle contacts this sensitized strip, a signal is sent to the electronic control module 200, which in turn shuts off the hydraulic pump motor 115. This obstacle detection feature is independent of the liftgate position.

Impulse Touch Start Feature

The hydraulic liftgate assembly in accordance with the present invention preferably includes an impulse touch start feature. This feature enables the operator to begin hydraulic power closure of the liftgate 16 by simply manually moving the fully opened liftgate 16 downwardly only a small distance, after which the hydraulic pump motor 115 is automatically activated so that the hydraulic pump 114 pressurizes the upper cylinder chambers 31 to complete the lowering of the liftgate 16. More specifically, the aforementioned position feedback device 206 sends a signal to the electronic control module 200, which in turn calculates the time at which the liftgate 16 reaches a predetermined position of movement. Preferably, the hydraulic pump motor 115 will be automatically activated only if the liftgate 16 reaches the predetermined position in more than a predetermined period of time. In other words, if the liftgate 16 is manually moved relatively slowly so that it reaches such predetermined position only after the predetermined amount of time, the electronic control module 200 will send a signal to the pump motor 115 to actuate the pump and begin automated liftgate pull-down. On the other hand, if the operator intends to manually close the liftgate through the entire range of closing motion, the operator should move the liftgate with sufficient speed (either by a fast initial swing and release of the liftgate or by rapid manual movement of the liftgate while the liftgate continues to be manually engaged) so that it reaches the predetermined position prior to the predetermined time. In such instance, the electronic control module 200 will not actuate the motor 115 of the hydraulic pump 114, and the liftgate 16 will be closed in the manual mode.

As noted above with respect to the obstacle detection feature, as an alternate arrangement the position of door travel can be derived from volumetric flow of hydraulic fluid, rather than utilizing the position feedback device. Additionally, the impulse touch start feature may be achieved by manually depressing the pressure sensitive strip affixed to the periphery of the door aperture or door frame. In this case, the switch sends an electrical signal to the electronic control module 200, which in turn initiates the closing cycle of the door. After a very brief predetermined amount of time, the tape switch reverts back to its original mode of operation: obstacle detection.

The impulse touch start closing feature is to be used in conjunction with an automated liftgate or closure opening system that effects automatic movement of the closure from the closed position to the opened position. While in the preferred embodiment this closure opening system takes the form of the aforementioned energy storage system, and in particular the accumulator assembly 140, the present invention contemplates that other closure opening systems can be used to automatically move the closure from the closed position to the opened position in response to an electrical signal (e.g., generated by a remote control device) without the need to manually engage and move the closure itself. For example, the motorized hydraulic pump could be used to reverse the direction of hydraulic fluid flow in comparison with the closing direction, or an automated mechanical spring operated system could be used.

Level Compensation Feature

As noted with respect to the obstacle detection feature, the gravitational moments acting on the liftgate 16 are influenced by the relative position of the liftgate. It can be appreciated that these forces will be further influenced by the relative incline or decline of the surface upon which the vehicle rests. For example, with the vehicle facing a relatively steep decline (e.g., 17 degrees with respect to horizontal), and with the liftgate 16 in the closed position, the gravitational forces that need to be overcome to initially open the liftgate will be greater in comparison with when the vehicle is on a level surface.

To accommodate for the particular incline or decline of the vehicle, the hydraulic liftgate includes a level detection and compensation system having a level detector 210 (See FIG. 3)that sends a signal to the controller 200. The controller, in turn, generates a control signal to appropriately adjust the lift line 108 pressure (pressure in the accumulator circuit) provided to the hydraulic actuators 20 for opening the liftgate. A pendulum switch, mercury switch or equivalents thereof can be used as the level detector for determining the incline or decline of the vehicle.

Thus, with the liftgate 16 closed, and the vehicle disposed at a relatively large decline, the accumulator assembly 140 will be pressurized to a greater extent (in comparison to when the vehicle is level) in order to compensate for the additional forces that will be necessary to open the liftgate 16. Level compensation allows the system to adjust the working pressures such that the optimal force balances are achieved at all times and hence the physical stresses on the vehicle and manual operating efforts are minimized.

To increase the pressure in the lift line, i.e., to store additional energy in the accumulator 140 in order to accommodate a steep decline, in the preferred embodiment the controller 200 activates motor 115 so that pump 114 provides additional hydraulic fluid to the lift line 108. Alternatively, a pneumatic pump in communication with the accumulator may pump additional air into the charge of compressed air 143. On the other hand, where the biased energy storage device constitutes a compressed spring device, such as a spring-loaded accumulator, in communication with hydraulic fluid in the lift line, the amount of energy stored in the device can be adjusted by varying the amount compression in the spring.

In the preferred embodiment, to release energy from the system, an energy releasing device, preferably in the form of pressure relief valve 146, in communication with the lift line, can be employed. As an alternative to pressure relief valve 146, a solenoid valve, air operated valve, or any other type valve that can be electronically controlled rather than pressure controlled is used. The electronically controlled valve is electrically connected to control module 200. This adds flexibility to the system, and allows the pressure within the system to be regulated as a function of incline/decline or any other parameter for that matter.

As another alternative for the energy releasing device that releases energy from the system, the pump 114 can be particularly constructed and arranged in the system 100 to withdraw fluid from the lift line at the appropriate time to draw energy out of the system.

It should be appreciated from the above that the vehicle level and compensation system controls the amount of energy stored in the biased energy storage system based upon the detected inclination or declination of the vehicle as detected by the vehicle level detector so that the amount of energy stored in the biased energy storage system when the closure is in the closed position is within a range that is generally commensurate with the amount of energy required to move the closure from the closed position to the opened position for the detected inclination or declination. Although possible, it is not necessary for the amount of energy stored in the biased energy storage system to vary in direct proportion or relation to the amount of energy required to move the closure from the closed position to the opened position. Rather, the present invention contemplates broadly that the amount of energy stored in the biased energy storage system is to be increased by the level detection and compensation system when the more energy is needed to open the liftgate and decreased by the level detection and compensation system when less energy is needed to open the liftgate.

It should be further appreciated that the level compensation feature of the present invention is advantageous in its use with the biased energy storage system and the lift line. Therefore, powered automatic closing capability, which is provided in the preferred embodiment of the present invention, need not be provided to reap the benefits of the level compensation feature.

Temperature Compensation Features

Hydraulic pressure in the accumulator assembly 140, as well as the rest of the lift line circuit will vary in proportion with temperature. This is due to the temperature dependency of gasses according to Boyle's law of ideal gasses (PV=nRT). It can be appreciated, therefore, that at very cold temperatures, the pressure within accumulator assembly 140 may become significantly lower, to the extent that the pressure therein is insufficient to pressurize the lower cylinder chambers 29 to the extent necessary to lift the liftgate 16 to a fully open position.

To accommodate for this possibility, a device for monitoring the amount of energy stored in the biased energy storage system and lift lines, preferably in the form of pressure transducer 156 provided in the lift line, continuously monitors the stored energy level in the biased energy storage system. An energy control system is also provided to adjust the amount of energy stored in the biased energy storage system based on the amount of energy stored therein as detected by the energy monitoring device. The different mechanisms by which the amount of stored energy can be adjusted are discussed above. Motorized hydraulic pump 114 and pressure relief valve 146 are, however, preferred.

In the preferred embodiment, when the controller 200 receives a signal from the pressure transducer 156 indicating that the pressure within the lower cylinder chambers 29, the accumulator assembly 140, and the hydraulic line therebetween is below a predetermined pressure for the particular vehicle inclination, (in a system which preferably combines temperature compensation with level compensation) the controller 200 will generate a signal to energize pump motor 115. As a result, the hydraulic pump 114 will withdraw hydraulic fluid from the hydraulic fluid reservoir 118 and pressurize the accumulator assembly 140 and the lower cylinder chambers 29 until they meet or exceed the predetermined pressure as detected by transducer 156. This procedure is accomplished whether the vehicle is running or idle.

On the other hand, at relatively high temperatures, the pressure within the accumulator assembly 140 and the lower cylinder chambers 29 may be higher than what is desirable. In this instance, pressure will be relieved through the lift line pressure relief valve 146, which is set to relieve pressure at a predetermined level. It can thus be appreciated that the pressure within the accumulator assembly 140 and the lower cylinder chambers 29 is maintained within a predetermined range at all times. It should be noted that the lift line pressure relief valve 146 may be substituted with a solenoid, air operated, or other type electronically controlled valve that can be controlled electronically through the control module 200 in order to facilitate a more flexible temperature compensation feature. In other words, the pressure at which the valve will open and close can be varied in accordance with incline/decline or any other desired parameter.

Because the upper cylinder chambers 31 freely drain and withdraw fluid to and from the hydraulic fluid reservoir 118 via hydraulic pull-down valve 112 (in the normal condition), there is no need for temperature compensation in this portion of the hydraulic system. When the system is idle, the pull-down line is essentially at atmospheric pressure.

The energy monitoring device and control system have been described as useful for accommodating for fluctuations in the ambient temperature. It should be appreciated, however, that the critical function of the energy monitoring device and control system is to minimize undesired fluctuations in the amount of energy stored in the energy storage system. While undesired energy level fluctuations can be attributed to changes in temperature, such fluctuations can be attributed to other causes, such as system leaks, as well.

It should be further appreciated that the temperature compensation feature of the present invention is advantageous in its use with the biased energy storage system and the lift line. Therefore, powered automatic closing capability, which is provided in the preferred embodiment of the present invention, need not be provided to reap the benefits of the temperature compensation feature.

It will be realized that the foregoing preferred specific embodiment of the present invention has been shown and described for the purposes of illustrating the functional and instructional principles of this invention and are subject to change without departure from such principles. Therefore, this invention includes all modifications encompassed within the spirit and scope of the following claims.

What is claimed is:

1. A hydraulic closure system for use in a motor vehicle and constructed and arranged to cooperate with a closure opening defined by an opening frame of the motor vehicle body, said system comprising:

a closure constructed and arranged to be pivotally mounted on the opening frame for movement between a closed position in which said closure closes the closure opening and an opened position in which said closure is oriented to permit access through the closure opening;

a latching structure constructed and arranged to latch said closure in said closed position and to unlatch said closure to permit said closure to move from said closed position to said opened position; and a manually overridable power control system including at least one hydraulic actuator assembly, a motorized hydraulic pump, and a biased energy storage system, said manually overridable power control system being constructed and arranged to enable automatic opening and closing of said closure and to permit manual closing of said closure, said at least one hydraulic actuator assembly being coupled at one end thereof to said closure and coupled at an opposite end thereof to said opening frame, said at least one hydraulic actuator assembly including a cylinder and a piston rod assembly, said piston rod assembly including a piston and a rod member connected to said piston, said piston being moveable within said cylinder in slidably sealed relation with inner walls of said cylinder, said rod member extending outwardly from a rod extension end of said cylinder, said piston rod assembly being moveable between an extended condition in which said rod member has a relatively large extent thereof extending outwardly from said rod extension end of said cylinder so as to create a distance between said one end and said opposite end of said at least one hydraulic actuator assembly sufficient to maintain said closure in said opened position and a contracted condition in which said rod member has a relatively smaller extent thereof extending outwardly from the rod extension end of said cylinder in comparison with said extended condition to create a distance between said one end and said opposite end of said at least one hydraulic actuator assembly that enables said closure to be disposed in said closed position, said biased energy storage system being constructed and arranged to store energy therein, said biased energy storage system applying a biasing force to said at least one hydraulic actuator assembly sufficient to move said closure from said closed position to said opened position and maintain said closure in said opened position when said energy stored therein is expended, said motorized hydraulic pump being operable to input energy to said at least one hydraulic actuator assembly to effect said closing of said closure by creating hydraulic fluid flow in one direction with respect to said cylinder on a first side of said piston to force said piston away from said rod extension end of said cylinder and move said at least one hydraulic actuator assembly against said biasing force from said extended condition to said contracted condition and said closure from said opened position to said closed position, said biased energy storage system being constructed and arranged to store a portion of the energy input to said at least one hydraulic actuator assembly by said motorized hydraulic pump when said closure is moved by operation of said pump from said opened position to said closed position, said biased energy storage system being constructed and arranged to expend energy stored therein on a second side of said piston and thus apply said biasing force when said closure is unlatched to move the piston toward said rod extension end of said cylinder and hence create hydraulic fluid flow in an opposite direction with respect to said cylinder on said first side of said piston and thereby move said at least one hydraulic actuator assembly from said contracted condition to said extended condition and move said closure from said closed position to said opened position and maintain said closure in said opened position, said manually overridable control system being constructed and arranged to permit manually generated movement of said closure from said opened position to said closed position to force said piston away from said rod extension end of said cylinder and move said at least one hydraulic actuator assembly against said biasing force from said extended condition to said contracted condition to create hydraulic fluid flow in said one direction with respect to said cylinder on said first side of said piston when said pump is in an inoperative state, said biased energy storage system being constructed and arranged to store a portion of energy input to said at least one hydraulic actuator assembly by said manually generated movement of said closure from said opened position to said closed position to enable said energy storage system to subsequently move said closure from said closed position to said opened position when said stored energy is expended.

2. The hydraulic closure system of claim 1 wherein said manually overridable power control system is further constructed and arranged to permit manually expedited movement of said closure from said opened position to said closed position after closing of said closure is commenced by operation of said motorized hydraulic pump.

3. The hydraulic closure system of claim 2 wherein said motorized hydraulic pump continues to operate to input energy to said at least one hydraulic actuator assembly during said manually expedited movement of said closure.

4. The hydraulic closure system of claim 1 wherein said biased energy storage system comprises a hydraulic fluid accumulator assembly in communication with said cylinder on the second side of said piston.

5. The hydraulic closure system of claim 1, further comprising a pull down valve constructed and arranged to communicate said at least one actuator with said motorized hydraulic pump when said motorized hydraulic pump operates to effect movement of said closure from said opened position to said closed position, said pull down valve being further constructed and arranged to communicate said at least one actuator with a reservoir of hydraulic fluid to enable said closure to be moved from said opened position to said closed position when said pump is in said inoperative state.

6. The hydraulic closure system of claim 1 wherein said motorized hydraulic pump is activated to input said energy to said at least one hydraulic actuator assembly to effect said closing of said closure in response to manually generated movement of said closure from said opened position toward said closed position for a prescribed distance in more than a prescribed time.

7. The hydraulic closure system of claim 1 further comprising:

an obstacle detection mechanism comprising a pressure transducer constructed and arranged to monitor hydraulic pressure resulting from said hydraulic fluid flow created by operation of said motorized hydraulic pump, said obstacle detection mechanism constructed and arranged to detect an obstacle interfering with said closing of said closure based upon the hydraulic pressure monitored by said pressure transducer and to terminate operation of said motorized hydraulic pump when the interfering obstacle is detected.

8. The hydraulic closure system of claim 6 further comprising:

an obstacle detection mechanism comprising a pressure transducer constructed and arranged to monitor hydraulic pressure resulting from said hydraulic fluid flow by operation of said motorized hydraulic pump, said obstacle detection mechanism constructed and arranged to detect an obstacle interfering with said closing of said closure based upon the hydraulic pressure monitored by said pressure transducer and to terminate operation of said motorized hydraulic pump when the interfering obstacle is detected.

9. The hydraulic closure system of claim 1 further comprising:

a vehicle level detection and compensation system including a vehicle level detector constructed and arranged to detect inclination or declination of the motor vehicle, said vehicle level detection and compensation system being constructed and arranged to control the amount of energy stored in said biased energy storage system based upon a detected inclination or declination of the vehicle as detected by said vehicle level detector so that the amount of energy stored in said biased energy storage system is generally commensurate with an amount of energy required to move said closure from said closed position to said opened position for the detected inclination or declination.

10. The hydraulic closure system of claim 6 further comprising:

a vehicle level detection and compensation system including a vehicle level detector constructed and arranged to detect inclination or declination of the motor vehicle, said vehicle level detection and compensation system being constructed and arranged to control the amount of energy stored in said biased energy storage system based upon a detected inclination or declination of the vehicle as detected by said vehicle level detector so that the amount of energy stored in said biased energy storage system is generally commensurate with an amount of energy required to move said closure from said closed position to said opened position for the detected inclination or declination.

11. The hydraulic closure system of claim 7 further comprising:

a vehicle level detection and compensation system including a vehicle level detector constructed and arranged to detect inclination or declination of the motor vehicle, said vehicle level detection and compensation system being constructed and arranged to control the amount of energy stored in said biased energy storage system based upon a detected inclination or declination of the vehicle as detected by said vehicle level detector so that the amount of energy stored in said biased energy storage system is generally commensurate with an amount of energy required to move said closure from said closed position to said opened position for the detected inclination or declination.

12. The hydraulic closure system of claim 8 further comprising:

a vehicle level detection and compensation system including a vehicle level detector constructed and arranged to detect inclination or declination of the motor vehicle, said vehicle level detection and compensation system being constructed and arranged to control the amount of energy stored in said biased energy storage system based upon a detected inclination or declination of the vehicle as detected by said vehicle level detector so that the amount of energy stored in said biased energy storage system is generally commensurate with an amount of energy required to move said closure from said closed position to said opened position for the detected inclination or declination.

13. The hydraulic closure system of claim 1,6,7,8,9,10, 11,or 12 further comprising:

an energy monitoring device constructed and arranged to monitor the amount of energy stored in said biased energy storage system; and an energy control system in communication with said energy monitoring device and constructed and arranged to control the amount energy stored in said biased energy storage system so that said amount of energy stored remains within a predetermined range which is generally commensurate with the amount of energy required to move said closure from the closed position to the opened position.

14. The hydraulic closure system of claim 1 wherein:

said closure is pivotally mounted on an upper horizontal portion of said opening frame by a pair of laterally spaced hinges, and said latching structure comprises a pair of electrically operated latching mechanisms disposed at opposite lower interior portions of said closure and cooperable with associated striker members.

15. The hydraulic closure system of claim 1 wherein said manually overridable control system comprises:

a hydraulic fluid reservoir;

a hydraulic line connecting said motorized hydraulic pump to said hydraulic fluid reservoir and to said cylinder on said first side of said piston; and a pull down valve disposed in said hydraulic line between said motorized hydraulic pump and said cylinder on said first side of said piston, said pull down valve being constructed and arranged to be movable between (i) a first position in which said pull down valve permits said cylinder on said first side of said piston to communicate with said reservoir thus enabling hydraulic fluid flow between said cylinder on said first side of said piston and said hydraulic fluid reservoir, and (ii) a second position in which said valve permits said motorized hydraulic pump to communicate with said cylinder on said first side of said piston thus permitting said motorized hydraulic pump to create said hydraulic fluid flow with respect to said cylinder on said first side of said piston and in which said communication between said cylinder on said first side of said piston and said reservoir is closed thus preventing hydraulic fluid flow between said cylinder on said first side of said piston and said reservoir, said pull down valve being biased into said first position when said motorized hydraulic pump is inoperative to permit hydraulic fluid flow between said cylinder on said first side of said piston and said reservoir and thus permit said manually generated movement of said closure from said opened position to said closed position, said pull down valve being constructed and arranged to be moved against said bias into said second position during operation of said motorized hydraulic pump to enable said motorized hydraulic pump to create said hydraulic fluid flow with respect to said cylinder on said first side of said piston to move said at least one hydraulic actuator assembly from said extended condition to said contracted condition and move said closure from said opened position to said closed position.

16. The hydraulic closure system of claim 15 wherein said pull down valve comprises a two position three-way valve.

17. The hydraulic closure system of claim 15 wherein said motorized hydraulic pump is a positive discharge pump and operation of said motorized hydraulic pump creates hydraulic fluid flow into said cylinder on said first side of said piston to increase hydraulic pressure in said cylinder on said first side of said piston relative to hydraulic pressure in said cylinder on said second side of said piston to force said piston away from said rod extension end of said of said cylinder and move said at least one hydraulic actuator assembly from said extended condition to said contracted condition and move said closure from said opened position to said closed position.

18. The hydraulic closure system of claim 1 wherein said biased energy storage system stores positive hydraulic pressure and expenditure of said energy on said second side of said piston creates hydraulic fluid flow into said cylinder on said second side of said piston.

19. The hydraulic closure system of claim 2 wherein said manually overridable control system comprises:

a hydraulic fluid reservoir;

a hydraulic line connecting said motorized hydraulic pump to said hydraulic fluid reservoir and to said cylinder on said first side of said piston;

a pull down valve disposed in said hydraulic line between said motorized hydraulic pump and said cylinder on said first side of said piston, said pull down valve being constructed and arranged to be movable between (i) a first position in which said pull down valve permits said cylinder on said first side of said piston to communicate with said reservoir thus enabling hydraulic fluid flow between said cylinder on said first side of said piston and said hydraulic fluid reservoir, and (ii) a second position in which said valve permits said motorized hydraulic pump to communicate with said cylinder on said first side of said piston thus permitting said motorized hydraulic pump to create said hydraulic fluid flow with respect to said cylinder on said first side of said piston and in which said communication between said cylinder on said first side of said piston and said reservoir is closed thus preventing hydraulic fluid flow between said cylinder on said first side of said piston and said reservoir, said pull down valve being biased into said first position when said motorized hydraulic pump is inoperative to permit hydraulic fluid flow between said cylinder on said first side of said piston and said reservoir and thus permit said manually generated movement of said closure from said opened position to said closed position, and a one-way valve disposed in said hydraulic line between said hydraulic fluid reservoir and said cylinder on said first side of said piston constructed and arranged to permit fluid flow therethrough in one direction between said hydraulic fluid reservoir and said cylinder on said first side of said piston when said pull down valve is in said second position, said pull down valve being constructed and arranged to be moved against said bias into said second position during operation of said motorized hydraulic pump to enable said motorized hydraulic pump to create said hydraulic fluid flow with respect to said cylinder on said first side of said piston to move said at least one hydraulic actuator assembly from said extended condition to said contracted condition and move said closure from said opened position to said closed position, said one-way valve permitting hydraulic fluid flow therethrough in said one direction between said cylinder on said first side of said piston and said hydraulic fluid reservoir and thus permitting movement of said closure from said opened position to said closed position during said closing of said closure by operation of said motorized hydraulic pump.

20. The hydraulic closure system of claim 1 wherein said at least one hydraulic actuator assembly comprises two hydraulic actuator assemblies, said hydraulic actuator assemblies each being coupled at one end thereof to respective opposite sides of said closure and at an opposite end thereof to respective opposite sides of said opening frame.

21. The hydraulic closure system of claim 4, further comprising: a flow restrictor disposed in a hydraulic line between said hydraulic fluid accumulator assembly and said at least one actuator, said restrictor restricting the amount of hydraulic fluid flow permitted to flow through said hydraulic line in a first direction during movement of said closure from said closed position to said opened position to thus restrict the speed at which said closure moves from said closed position to said opened position, and a one-way valve bypass valve disposed in parallel with said flow restrictor to permit flow of hydraulic fluid in a second direction opposite to said first direction during manually generated movement of said closure from said opened position to said closed position to thus permit said closure to be manually moved from said opened position to said closed position at a speed faster that the speed at which said closure is moved from said closed position to said opened position.

22. A hydraulic closure system according to claim 1, wherein said latching structure is constructed and arranged to be electrically unlatched in response to an input signal received from a remote control device, and wherein said biased energy storage system releases said stored energy once said latching structure is unlatched to effect movement of said closure from said closed position to said opened position.

23. A hydraulic closure system for use in a motor vehicle and constructed and arranged to cooperate with a closure opening defined by an opening frame of the motor vehicle body, said system comprising:

a closure constructed and arranged to be pivotally mounted on the opening frame for movement between a closed position in which said closure closes the closure opening and an opened position in which said closure is oriented to permit access through the closure opening;

a latching structure constructed and arranged to latch said closure in said closed position and to unlatch said closure to permit said closure to move from said closed position to said opened position;

at least one hydraulic actuator assembly being coupled at one end thereof to said closure and coupled at an opposite end thereof to said opening frame, said at least one hydraulic actuator assembly including a cylinder and a piston rod assembly, said piston rod assembly including a piston and a rod member connected to said piston, said piston being moveable within said cylinder in slidably sealed relation with inner walls of said cylinder, said rod member extending outwardly from a rod extension end of said cylinder, said piston rod assembly being moveable between an extended condition in which said rod member has a relatively large extent thereof extending outwardly from said rod extension end of said cylinder so as to create a distance between said one end and said opposite end of said at least one hydraulic actuator assembly sufficient to maintain said closure in said opened position and a contracted condition in which said rod member has a relatively smaller extent thereof extending outwardly from the rod extension end of said cylinder in comparison with said extended condition to create a distance between said one end and said opposite end of said at least one hydraulic actuator assembly that enables said closure to be disposed in said closed position;

an automated closure opening system constructed and arranged to effect automatic movement of said closure from said closed position to said opened position when said latching structure is unlatched, said automated closure opening system comprising a biased energy storage system constructed and arranged to store energy therein and apply a biasing force to said at least one hydraulic actuator assembly sufficient to move said closure from said closed position to said opened position and maintain said closure in said opened position when said energy stored therein is expended, and wherein said biased energy storage system expends said stored energy to move said closure from said closed position to said opened position when permitted to do so by unlatching of said latching structure; and a motorized hydraulic pump constructed and arranged to effect automated closing of said closure by creating hydraulic fluid flow with respect to said cylinder to force said piston away from said rod extension end of said cylinder and move said at least one hydraulic actuator assembly from said extended condition to said contracted condition and said closure from said opened position to said closed position, said motorized hydraulic pump being activated to effect said closing of said closure in response to manually generated movement of said closure from said opened position toward said closed position.

24. The hydraulic closure system of claim 23 wherein said motorized hydraulic pump is activated in response to said manually generated movement of said closure from said opened position toward said closed position for a prescribed distance in more than a prescribed time.

25. The hydraulic closure system of claim 23, wherein said automated closure opening system comprises an electrically operable remote control device constructed and arranged to unlatch said latching structure from a remote location.

26. The hydraulic closure system of claim 23 wherein said at least one hydraulic actuator assembly comprises two hydraulic actuator assemblies, each hydraulic actuator assembly being coupled at said one end thereof to respective opposite sides of said closure and at said opposite end thereof to respective opposite sides of said opening frame.

27. The hydraulic closure system of claim 1 wherein:

said closure is pivotally mounted on an upper horizontal portion of said opening frame by a pair of laterally spaced hinges, and said latching structure comprises a pair of electrically operated latching mechanisms disposed at opposite lower interior portions of said closure and cooperable with associated striker members.

28. The hydraulic closure system of claim 1 wherein said motorized hydraulic pump is a positive discharge pump and operation of said motorized hydraulic pump creates hydraulic fluid flow into said cylinder on said first side of said piston to increase hydraulic pressure in said cylinder on said first side of said piston relative to hydraulic pressure in said cylinder on said second side of said piston to force said piston away from said rod extension end of said of said cylinder and move said at least one hydraulic actuator assembly from said extended condition to said contracted condition and move said closure from said opened position to said closed position.

29. The hydraulic closure system of claim 24, further comprising a position feedback device constructed and arranged to detect the position of the closure, and a control module which calculates the time that it takes the closure to reach a predetermined position detected by the feedback device, said control module generating a signal to activate said motorized hydraulic pump in response to said control module determining that said closure has reached said predetermined position in more than said prescribed time.

30. A hydraulic closure system for use in a motor vehicle and constructed and arranged to cooperate with a closure opening defined by an opening frame of the motor vehicle body, said hydraulic closure system comprising:

a closure constructed and arranged to be pivotally mounted on the opening frame for movement between a closed position in which said closure closes the closure opening and an opened position in which said closure is oriented to permit access through the closure opening;

a latching structure constructed and arranged to latch said closure in said closed position and to unlatch said closure to permit said closure to move from said closed position to said opened position;

at least one hydraulic actuator assembly coupled at one end thereof to said closure and coupled at an opposite end thereof to said opening frame, said at least one hydraulic actuator assembly including a cylinder and a piston rod assembly, said piston rod assembly including a piston and a rod member connected to said piston, said piston being moveable within said cylinder in slidably sealed relation with inner walls of said cylinder, said rod member extending outwardly from a rod extension end of said cylinder, said piston rod assembly being moveable between an extended condition in which said rod member has a relatively large extent thereof extending outwardly from said rod extension end of said cylinder so as to create a distance between said one end and said opposite end of said at least one hydraulic actuator assembly sufficient to maintain said closure in said opened position and a contracted condition in which said rod member has a relatively smaller extent thereof extending outwardly from the rod extension end of said cylinder in comparison with said extended condition to create a distance between said one end and said opposite end of said at least one hydraulic actuator assembly that enables said closure to be disposed in said closed position, an automated closure opening system constructed and arranged to effect automatic movement of said closure from said closed position to said opened position when said latching structure in unlatched, a motorized hydraulic pump constructed and arranged to input energy to said at least one hydraulic actuator assembly to effect automatic movement of said closure from said opened position to said closed position by creating hydraulic fluid flow with respect to said cylinder on a first side of said piston to force said piston away from said rod extension end of said cylinder and move said at least one hydraulic actuator assembly from said extended condition to said contracted condition and said closure from said opened position to said closed position; and an obstacle detection mechanism comprising a pressure transducer constructed and arranged to monitor hydraulic pressure resulting from said hydraulic fluid flow created on said first side of said piston by operation of said motorized hydraulic pump, said obstacle detection mechanism constructed and arranged to detect an obstacle interfering with said automatic movement of said closure from said opened position to said closed position by operation of said motorized hydraulic pump based upon the hydraulic pressure monitored by said pressure transducer and to terminate operation of said motorized hydraulic pump when the hydraulic pressure monitored by said pressure transducer exceeds a prescribed threshold value which varies as a function of position of said closure with respect to the closure opening.

31. The hydraulic closure system of claim 30 wherein said obstacle detection mechanism comprises a piston rod extension measuring device for measuring extension of said rod member to ascertain a position of said closure with respect to said closure opening for varying said threshold value.

32. The hydraulic closure system of claim 31 wherein said piston rod extension measuring device comprises a potentiometer operatively coupled with said piston rod.

33. The hydraulic closure system of claim 30 wherein said at least one hydraulic actuator assembly comprises two hydraulic actuator assemblies, each hydraulic actuator assembly being coupled at said one end thereof to respective opposite sides of said closure and at said opposite end thereof to respective opposite sides of said opening frame.

34. The hydraulic closure system of claim 30 wherein:

said closure is pivotally mounted on an upper horizontal portion of said opening frame by a pair of laterally spaced hinges, and said latching structure comprises a pair of electrically operated latching mechanisms disposed at opposite lower interior portions of said closure and cooperable with associated striker members.

35. The hydraulic closure system of claim 30 wherein said motorized hydraulic pump is a positive discharge pump and operation of said motorized hydraulic pump creates hydraulic fluid flow into said cylinder on said first side of said piston to increase hydraulic pressure in said cylinder on said first side of said piston relative to hydraulic pressure in said cylinder on said second side of said piston to force said piston away from said rod extension end of said of said cylinder and move said at least one hydraulic actuator assembly from said extended condition to said contracted condition and move said closure from said opened position to said closed position.

36. The hydraulic closure system of claim 30 wherein said motorized hydraulic pump is activated to input said energy to said at least one hydraulic actuator assembly to effect said automatic movement of said closure from said opened position to said closed position in response to manually generated movement of said closure from said opened position toward said closed position for a prescribed distance.

37. The hydraulic closure system of claim 30, wherein said automated closure opening system comprises an electrically operable remote control device constructed and arranged to unlatch said latching structure from a remote location and a biased energy storage system, said biased energy storage system being constructed and arranged to store energy therein and apply a biasing force to said at least one hydraulic actuator assembly sufficient to move said closure from said closed position to said opened position and maintain said closure in said opened position when said energy stored therein is expended, and wherein said biased energy storage system expends said stored energy to move said closure from said closed position to said opened position when permitted to do so by unlatching of said latching structure.

38. The hydraulic closure system of claim 37, further comprising a vehicle level detection and compensation system including a vehicle level detector constructed and arranged to detect inclination or declination of the motor vehicle, said vehicle level detection and compensation system being constructed and arranged to control the amount of energy stored in said biased energy storage system based upon a detected inclination or declination of the vehicle as detected by said vehicle level detector so that the energy stored in said biased energy storage system is generally commensurate with an amount of energy required to move said closure from said closed position to said opened position for the detected inclination or declination.

39. The hydraulic closure system of claim 37 further comprising:

an energy monitoring device constructed and arranged to monitor the amount of energy stored in said biased energy storage system; and an energy control system in communication with said energy monitoring device and constructed and arranged to control the amount energy stored in said biased energy storage system so that said amount of energy remains within a predetermined range so that said amount of energy remains generally commensurate with the energy required to move said closure from the closed position to the opened position.

40. The hydraulic closure system of claim 39 further comprising a vehicle level detection and compensation system including a vehicle level detector constructed and arranged to detect inclination or declination of the motor vehicle, said vehicle level detection and compensation system being constructed and arranged to control the amount of energy stored in said biased energy storage system based upon a detected inclination or declination of the vehicle as detected by said vehicle level detector so that the energy stored in said biased energy storage system is commensurate with an amount of energy required to move said closure from said closed position to said opened position for the detected inclination or declination.

41. A hydraulic closure system for use in a motor vehicle and constructed and arranged to cooperate with a closure opening defined by an opening frame of the motor vehicle body, said hydraulic closure system comprising:

a closure constructed and arranged to be pivotally mounted on the opening frame for movement between a closed position in which said closure closes the closure opening and an opened position in which said closure is oriented to permit access through the closure opening;

a latching structure constructed and arranged to latch said closure in said closed position and to unlatch said closure to permit said closure to move from said closed position to said opened position;

at least one hydraulic actuator assembly coupled at one end thereof to said closure and coupled at an opposite end thereof to said opening frame, said at least one hydraulic actuator assembly including a cylinder and a piston rod assembly, said piston rod assembly including a piston and a rod member connected to said piston, said piston being moveable within said cylinder in slidably sealed relation with inner walls of said cylinder, said rod member extending outwardly from a rod extension end of said cylinder, said piston rod assembly being moveable between an extended condition in which said rod member has a relatively large extent thereof extending outwardly from said rod extension end of said cylinder so as to create a distance between said one end and said opposite end of said at least one hydraulic actuator assembly sufficient to maintain said closure in said opened position and a contracted condition in which said rod member has a relatively smaller extent thereof extending outwardly from the rod extension end of said cylinder in comparison with said extended condition to create a distance between said one end and said opposite end of said at least one hydraulic actuator assembly that enables said closure to be disposed in said closed position;

a biased energy storage system constructed and arranged to expend energy stored therein on a first side of said piston when said closure is unlatched to move said piston toward said rod extension end of said cylinder and thereby move said at least one hydraulic actuator assembly from said contracted condition to said extended condition and move said closure from said closed position to said opened position and maintain said closure in said opened position; and a vehicle level detection and compensation system including a vehicle level detector constructed and arranged to detect inclination or declination of the motor vehicle, said vehicle level detection and compensation system being constructed and arranged to control the amount of energy stored in said biased energy storage system based upon a detected inclination or declination of the vehicle as detected by said vehicle level detector so that the energy stored in said biased energy storage system is commensurate with an amount of energy required to move said closure from said closed position to said opened position for the detected inclination or declination.

42. The hydraulic closure system of claim 41 wherein said vehicle level detection and compensation system includes a motorized hydraulic pump constructed and arranged to input energy to said biased energy storage system by creating hydraulic fluid flow with respect to said biased energy storage system to increase the energy stored in said biased energy storage system when an orientation of the motor vehicle detected by said vehicle level detector is such that additional energy is required to be expended by said biased energy storage system on said first side of said piston when said closure is unlatched to move said at least one hydraulic actuator assembly from said contracted condition to said extended condition and move said closure from said closed position to said opened position and maintain said closure in said opened position, said motorized hydraulic pump being further constructed and arranged to input energy to said at least one hydraulic actuator assembly to effect automatic movement of said closure from said opened position to said closed position, said motorized hydraulic pump inputting said energy to said at least one hydraulic actuator assembly to effect said automatic movement of said closure from said opened position to said closed position by creating hydraulic fluid flow with respect to said cylinder on a second side of said piston to force said piston away from said rod extension end of said cylinder and move said at least one hydraulic actuator assembly from said extended condition to said contracted condition and said closure from said opened position to said closed position.

43. The hydraulic closure system of claim 42 wherein said vehicle level detection and compensation system comprises a stored energy releasing device constructed and arranged to release energy from said biased energy storage system by permitting fluid flow with respect to said biased energy storage system to decrease the amount energy stored in said biased energy storage system when an orientation of the motor vehicle detected by said vehicle level detector is such that less energy is required to be expended on said first side of said piston when said closure is unlatched to move said at least one hydraulic actuator assembly from said contracted condition to said extended condition and move said closure from said closed position to said opened position and maintain said closure in said opened position.

44. The hydraulic closure system of claim 41 wherein said biased energy storage system comprises a hydraulic fluid accumulator assembly in communication with said first side of said piston and wherein said stored energy releasing device comprises a pressure relief valve in communication with said hydraulic fluid accumulator and in communication with said vehicle level detector.

45. The hydraulic closure system of claim 44 wherein said hydraulic fluid accumulator assembly comprises a gas-charged accumulator.

46. The hydraulic closure system of claim 41 wherein said vehicle level detector comprises a pendulum switch.

47. The hydraulic closure system of claim 41 wherein said vehicle level detector comprises a mercury switch.

48. The hydraulic closure system of claim 41 wherein said at least one hydraulic actuator assembly comprises two hydraulic actuator assemblies, each hydraulic actuator assembly being coupled at one end thereof to respective opposite sides of said closure and at opposite ends thereof to respective opposite sides of said opening frame.

49. The hydraulic closure system of claim 41 wherein:

said closure is pivotally mounted on an upper horizontal portion of said opening frame by a pair of laterally spaced hinges, and said latching structure comprises an electrically operated latching mechanism disposed at a lower interior portion of said closure and constructed and arranged to be latched to an associated striker member connected to the opening frame.

50. The hydraulic closure system of claim 41 wherein said vehicle level detection and compensation system includes an energy monitoring device constructed and arranged to monitor the amount of energy stored in said biased energy storage system to enable said vehicle level detection and compensation system to control the amount of energy stored in said biased energy storage system based upon the detected inclination or declination of the vehicle as detected by said vehicle level detector and based upon an amount of energy stored in said biased energy storage system as monitored by said energy monitoring device.

51. The hydraulic closure system of claim 50 wherein said biased energy storage system comprises a hydraulic fluid accumulator assembly in communication with said first side of said piston and wherein said energy monitoring device comprises a pressure transducer in communication with said hydraulic fluid accumulator.

52. The hydraulic closure system of claim 51 wherein said hydraulic fluid accumulator assembly comprises a gas-charged accumulator.

53. The hydraulic closure system of claim 41 wherein said biased energy storage system stores positive hydraulic pressure and expenditure of said energy on said second side of said piston creates hydraulic fluid flow into said cylinder on said second side of said piston.

54. The hydraulic closure system of claim 41, wherein said motorized hydraulic pump is activated to effect said automatic movement of said closure from said opened position to said closed position in response to manually generated movement of said closure from said opened position toward said closed position.

55. The hydraulic closure system of claim 54 wherein said motorized hydraulic pump is activated to input said energy to said at least one hydraulic actuator assembly to effect said automatic movement of said closure from said opened position to said closed position in response to said manually generated movement of said closure from said opened position toward said closed position for a prescribed distance in more than a prescribed time.

56. A hydraulic closure system for use in a motor vehicle and constructed and arranged to cooperate with a closure opening defined by an opening frame of the motor vehicle body, said system comprising:

a closure constructed and arranged to be pivotally mounted on the opening frame for movement between a closed position in which said closure closes the closure opening and an opened position in which said closure is oriented to permit access through the closure opening;

a latching structure constructed and arranged to latch said closure in said closed position and to unlatch said closure to permit said closure to move from said closed position to said opened position;

at least one hydraulic actuator assembly including a cylinder and a piston rod assembly, said piston rod assembly including a piston and a rod member connected to said piston, said piston being moveable within said cylinder in slidably sealed relation with inner walls of said cylinder, said rod member extending outwardly from a rod extension end of said cylinder, said piston rod assembly being moveable between an extended condition in which said rod member has a relatively large extent thereof extending outwardly from said rod extension end of said cylinder so as to create a distance between said one end and said opposite end of said at least one hydraulic actuator assembly sufficient to maintain said closure in said opened position and a contracted condition in which said rod member has a relatively smaller extent thereof extending outwardly from the rod extension end of said cylinder in comparison with said extended condition to create a distance between said one end and said opposite end of said at least one hydraulic actuator assembly that enables said closure to be disposed in said closed position;

a biased energy storage system constructed and arranged to expend energy stored therein on a first side of said piston when said closure is unlatched to move the piston toward said rod extension end of said cylinder and thereby move said at least one hydraulic actuator assembly from said contracted condition to said extended condition and move said closure from said closed position to said opened position and maintain said closure in said opened position;

an energy monitoring device constructed and arranged to monitor the amount of energy stored in said biased energy storage system; and an energy control system in communication with said energy monitoring device and constructed and arranged to control the amount energy stored in said biased energy storage system so that said amount of energy remains within a predetermined range so that said amount of energy remains commensurate with the energy required to move said closure from the closed position to the opened position.

57. The hydraulic closure system of claim 56, wherein said energy control system includes a motorized hydraulic pump constructed and arranged to input energy to said biased energy storage system by creating fluid flow with respect to said biased energy storage system to increase the amount of energy stored in said biased energy storage system when the amount of energy stored in said biased energy storage system detected by said energy monitoring device is less than a predetermined amount of energy required to be expended on said first side of said piston when said closure is unlatched to move said at least one hydraulic actuator assembly from said contracted condition to said extended condition and move said closure from said closed position to said opened position and maintain said closure in said opened position, said motorized hydraulic pump being further constructed and arranged to input energy to said at least one hydraulic actuator assembly to effect automatic movement of said closure from said opened position to said closed position, said motorized hydraulic pump inputting said energy to said at least one hydraulic actuator assembly to effect said automatic movement of said closure from said opened position to said closed position by creating hydraulic fluid flow with respect to said cylinder on a second side of said piston to force said piston away from said rod extension end of said cylinder and move said at least one hydraulic actuator assembly from said extended condition to said contracted condition and said closure from said opened position to said closed position.

58. The hydraulic closure system of claim 56 wherein said energy control system comprises a stored energy releasing device constructed and arranged to release energy from said biased energy storage system when the amount of energy stored in said biased energy storage system detected by said energy monitoring device exceeds said predetermined range of energy so that the amount of energy stored in said biased energy storage system remains commensurate with the amount of energy required to move said closure from said closed position to said opened position and maintain said closure in said opened position.

59. The hydraulic closure system of claim 58, wherein said energy releasing device comprises a pressure relief valve, and wherein said biased energy storage system comprises a pressure accumulator assembly, said pressure relief valve being constructed and arranged to relieve pressure from said pressure accumulator assembly and hence to release energy from said biased energy storage system when the amount of energy stored in said biased energy storage system detected by said energy monitoring device amount of energy exceeds said predetermined range so that said amount of energy stored remains commensurate with the energy required to move said closure from the closed position to the opened position.

60. The hydraulic closure system of claim 57, wherein said energy control system comprises a stored energy releasing device constructed and arranged to release energy from said biased energy storage system by permitting hydraulic fluid flow with respect to said biased energy storage system to decrease the energy stored in said biased energy storage system when the amount of energy stored in said biased energy storage system detected by said energy monitoring device exceeds said predetermined amount of energy required to be expended on said first side of said pistons when said closure is unlatched to move said pair of hydraulic actuator assemblies from said contracted condition to said extended condition and move said closure from said closed position to said opened position and maintain said closure in said opened position.

61. The hydraulic closure system of claim 56 further comprising a vehicle level detection and compensation system including a vehicle level detector constructed and arranged to detect inclination or declination of the motor vehicle, said vehicle level detection and compensation system being constructed and arranged to vary said predetermined range based upon a detected inclination or declination of the vehicle as detected by said vehicle level detector so that the amount of energy stored in said biased energy storage system is commensurate with the amount of energy required to move said closure from said closed position to said opened position for the detected inclination or declination.

62. The hydraulic closure system of claim 56 wherein said at least one hydraulic actuator assembly comprises two hydraulic actuator assemblies, each hydraulic actuator assembly being coupled at said one end thereof to respective opposite sides of said closure and at said opposite end thereof to respective opposite sides of said opening frame.

63. The hydraulic closure system of claim 58 wherein said biased energy storage system comprises a hydraulic fluid accumulator assembly in communication with said first side of said piston, said energy monitoring device comprises a pressure transducer in communication with said hydraulic fluid accumulator, and said stored energy releasing device comprises a pressure relief valve in communication with said hydraulic fluid accumulator and in communication with said pressure transducer.

64. The hydraulic closure system of claim 56 wherein:

said closure is pivotally mounted on an upper horizontal portion of said opening frame by a pair of laterally spaced hinges, and said latching structure comprises a pair of electrically operated latching mechanisms disposed at opposite lower interior portions of said closure and cooperable with associated striker members.

65. The hydraulic closure system of claim 56 wherein said biased energy storage system stores positive hydraulic pressure and expenditure of said energy on said second side of said piston creates hydraulic fluid flow into said cylinder on said second side of said piston.

66. The hydraulic closure system of claim 56, wherein said motorized hydraulic pump is activated to input said energy to said at least one hydraulic actuator assembly to effect said automatic movement of said closure from said opened position to said closed position in response to manually generated movement of said closure from said opened position toward said closed position.

67. The hydraulic closure system of claim 56 wherein said motorized hydraulic pump is activated to input said energy to said at least one hydraulic actuator assembly to effect said automatic movement of said closure from said opened position to said closed position in response to said manually generated movement of said closure from said opened position toward said closed position for a prescribed distance in more than a prescribed time.

68. A hydraulic closure system for use in a motor vehicle and constructed and arranged to cooperate with a closure opening defined by an opening frame of the motor vehicle body, said system comprising:

a closure constructed and arranged to be mounted on an upper portion of the opening frame and pivoted for movement about a horizontal axis between a closed position in which said closure closes the closure opening and an opened position in which said closure is oriented to permit access through the closure opening;

an electrically operated latching structure constructed and arranged to latch said closure when said closure is moved to said closed position and to unlatch said closure in response to a first electrical signal to permit said closure to move from said closed position to said opened position;

a manually overridable power control system including at least one hydraulic actuator assembly, said at least one hydraulic actuator assembly coupling said closure with said closure opening and being capable of effecting movement of said closure between said opened and closed positions in response to hydraulic fluid flow generated by said manually overridable power control system, said manually overridable power control system including an energy storage system constructed and arranged to store energy therein and to expend energy stored therein to effect hydraulic fluid flow that causes said at least one hydraulic actuator assembly to move said closure from said closed position to said opened position when said latching structure is unlatched in response to said first electrical signal, said manually overridable power control system being constructed and arranged to effect hydraulic fluid flow that causes said at least one hydraulic actuator assembly to move said closure from said opened position to said closed position in response to a second electrical signal;

a remote control device; and an electrical controller responsive to selective activation of said remote control device to generate said first electrical signal to unlatch said latching structure and thereby permit said manually overridable power control system to effect hydraulic fluid flow that causes said at least one actuator to move said closure from said closed position to said opened position, said electrical controller being responsive to selective activation of said remote control device to generate said second electrical signal so that said manually overridable power control system effects, hydraulic fluid flow that causes said at least one hydraulic actuator assembly to move said closure from said opened position to said closed position, said manually overridable power control system permitting manually generated movement of said closure from said opened position to said closed position.

* * * * *